US009318308B2

(12) United States Patent
Brown et al.

(10) Patent No.: US 9,318,308 B2
(45) Date of Patent: Apr. 19, 2016

(54) MALDI IMAGING AND ION SOURCE

(71) Applicant: Micromass UK Limited, Wilmslow (GB)

(72) Inventors: Jeffery Mark Brown, Hyde (GB); Paul Murray, Manchester (GB); Daniel James Kenny, Knutsford (GB)

(73) Assignee: Micromass UK Limited, Wilmslow (GB)

(*) Notice: Subject to any disclaimer, the term of this patent is extended or adjusted under 35 U.S.C. 154(b) by 0 days.

(21) Appl. No.: 14/941,741

(22) Filed: Nov. 16, 2015

(65) Prior Publication Data

US 2016/0071716 A1 Mar. 10, 2016

Related U.S. Application Data

(63) Continuation of application No. 14/130,453, filed as application No. PCT/GB2012/051608 on Jul. 6, 2012, now Pat. No. 9,190,256.

(60) Provisional application No. 61/508,277, filed on Jul. 15, 2011.

(30) Foreign Application Priority Data

Jul. 6, 2011 (GB) .................................. 1111569.8

(51) Int. Cl.
*H01J 49/40* (2006.01)
*G01N 27/62* (2006.01)
*H01J 49/06* (2006.01)

(52) U.S. Cl.
CPC ............. *H01J 49/062* (2013.01); *H01J 49/065* (2013.01)

(58) Field of Classification Search
CPC ..... H01J 49/062; H01J 49/164; H01J 49/065; H01J 49/0004; H01J 49/40; H01J 49/0027; H01J 49/0031; H01J 49/02; H01J 49/0418; G01N 27/622
USPC .............. 250/282, 288, 281, 423 P, 283, 286, 250/294, 295, 396 R
See application file for complete search history.

(56) References Cited

U.S. PATENT DOCUMENTS 5,118,937 A 6/1992 Hillenkamp et al.
5,917,185 A * 6/1999 Yeung ................. H01J 49/0404 250/288
5,955,729 A * 9/1999 Nelson ................. G01N 21/553 250/282
6,051,287 A * 4/2000 Marsh ................. C23C 16/4485 427/226
6,057,543 A * 5/2000 Vestal ................... H01J 49/403 250/282
6,444,980 B1 * 9/2002 Kawato ................. H01J 49/164 250/281
6,812,453 B2 * 11/2004 Bateman ............... H01J 49/062 250/281
6,960,760 B2 * 11/2005 Bateman ............... H01J 49/062 250/281
7,459,676 B2 12/2008 Kovtoun
(Continued)

FOREIGN PATENT DOCUMENTS

JP 2007225285 9/2007

*Primary Examiner* — David A Vanore
(74) *Attorney, Agent, or Firm* — Diederiks & Whitelaw, PLC

(57) ABSTRACT

An ion source for a mass spectrometer is disclosed comprising a lens and mirror arrangement which focuses a laser beam onto the upper surface of a target substrate. The lens has an effective focal length ≤300 mm. The laser beam is directed onto the target substrate at an angle θ with respect to the perpendicular to the target substrate, wherein θ≤3°. One or more ion guides receive ions released from the target substrate and onwardly transmit the ions along an ion path which substantially bypasses the lens and mirror.

20 Claims, 10 Drawing Sheets

(56) References Cited

U.S. PATENT DOCUMENTS 7,838,824 B2 * 11/2010 Vestal .................. H01J 49/004 250/282
8,294,086 B2 * 10/2012 Holle .................. H01J 49/0045 250/281
8,581,182 B2 * 11/2013 Giles ....................... H01J 49/26 250/282
8,829,464 B2 * 9/2014 Hoyes .................. G01N 27/622 250/282
8,835,839 B1 * 9/2014 Anderson ............. H01J 49/062 250/290
2003/0183760 A1 * 10/2003 Tsybin ................ H01J 49/0054 250/292
2014/0191123 A1 * 7/2014 Wildgoose ............ H01J 49/061 250/282
2014/0224974 A1 * 8/2014 Kenny ................ H01J 49/0059 250/282
2015/0034814 A1 * 2/2015 Brown .................. H01J 49/164 250/282

* cited by examiner

MALDI IMAGING AND ION SOURCE

CROSS-REFERENCE TO RELATED APPLICATIONS

This application is a continuation application of U.S. Ser. No. 14/130,453, filed 31 Dec. 2013, which is the National Stage of International Application No. PCT/GB2012/051608, filed 6 Jul. 2012, which claims priority from and the benefit of U.S. Provisional Patent Application Ser. No. 61/508,277 filed on 15 Jul. 2011 and United Kingdom Patent Application No. 1111569.8 filed on 6 Jul. 2011. The entire contents of these applications are incorporated herein by reference.

BACKGROUND OF THE PRESENT INVENTION

The present invention relates generally to an apparatus and method of mass spectrometry. More specifically, although not exclusively, this invention relates to a mass spectrometer and a method of mass spectrometry. Mass spectrometers configured for Matrix-Assisted Laser Desorption Ionisation ("MALDI") are known. MALDI is a soft ionisation technique for mass spectrometry in which the analyte molecules are prepared on the surface of a target plate. They are supported in a solid polycrystalline matrix. A pulse of laser radiation, with a typical duration of a few nanoseconds, is directed onto the MALDI sample which is strongly absorbed by the matrix molecules. This pulse of laser energy results in rapid heating of the region that is irradiated. This heat causes a proportion of the matrix material to be vaporised and explosively ejected from the surface as a plume of gaseous material (desorption). Analyte ions, embedded within the matrix that is desorbed, are transferred to the gaseous phase along with the matrix. Reactions between the matrix ions and the analyte molecules can result in the analyte molecules being ionised either through protonation/deprotonation or through the removal or addition of an ion. Upon dispersal of the initial MALDI plume, the remaining analyte ions are predominantly singly charged.

Although the absorption of the laser radiation occurs at all levels of laser fluence, there is a threshold energy density required in order to obtain desorption of material under illumination.

MALDI imaging is a growing technique where the sample to be analysed may be a thin (typically 15 μm) section of tissue, with a layer of matrix deposited upon the surface. The sample is scanned in a raster manner, with the laser firing at specific locations or ranges of locations spaced along the raster pattern. Mass spectra are acquired at each location or range of locations and the relative abundance of ion masses is then displayed as an ion image of the tissue section. The image resolution to which the spatial distribution of ions can be determined is a function of the distance between each spectral location and the area of the sample irradiated above the ionisation threshold by each individual laser pulse. Therefore, the spatial resolution can be improved by the use of a small diameter laser intensity profile. A shorter distance from the final laser lens to the sample is therefore advantageous in improving the spatial resolution of the ion image.

In order to obtain a high spatial resolution of the MALDI source, the area irradiated by the laser pulse must be reduced in area. This is determined by several factors associated with the laser beam profile incident upon the focusing element, including the beam diameter and the beam profile. It is also determined by the focal length of the focusing optic, and hence the working distance between the lens and the MALDI sample plate. One further issue that determines the size of the laser pulse incident on the sample is the angle of incidence of the laser beam. With this in mind it is preferable to ensure that the laser beam is orthogonally incident upon the sample target.

The plume and analyte ions formed by irradiation by the laser tends to expand in a direction towards the incident laser beam. This is because of the inhomogeneous surface topography of the MALDI sample and crystalline matrix. Reference is made to P. Aksouh et al. Rapid Commun. Mass Spectrometry, 9 (1995) 515.

The ions formed in the MALDI plume must be transferred into the analyser. This requires electrodes to be located in close proximity to the sample target. In high vacuum MALDI instruments, the requirement for electrostatic lenses to be also arranged along the ion optic axis to enable ion acceleration orthogonal to the sample plate generally precludes the ability to locate laser optics along the same path. Consequently, many MALDI mass spectrometers are designed with the laser incident at a small but non-zero angle of incidence. For other systems with orthogonal illumination electrostatic deflectors have been used to guide ions around the laser optics.

With intermediate pressure MALDI, where a hexapole RF guide is used to transfer ions, the RF device prevents the possibility of locating laser optics designed specifically to provide orthogonal illumination. Furthermore, the RF lenses limit the possibility of providing a final focus lens close to the MALDI sample plate. Similar constraints also apply to atmospheric pressure MALDI instrumentation.

It is desired to provide an improved mass spectrometer and method of mass spectrometry.

SUMMARY OF THE PRESENT INVENTION

According to an aspect of the present invention there is provided an ion source for a mass spectrometer comprising:

one or more optical components arranged and adapted to focus, in use, a laser beam so as to impinge directly upon an upper surface of a target substrate in order to cause the release of ions from the upper surface. The one or more optical components preferably have an effective focal length ≤300 mm and wherein, in use, the one or more optical components direct the laser beam onto the target substrate at an angle θ with respect to the perpendicular to the target substrate.

According to the preferred embodiment θ≤3°.

One or more ion guides are preferably arranged and adapted to receive ions released from the upper surface of the target substrate and to onwardly transmit the ions along an ion path which substantially bypasses or otherwise avoids the one or more optical components.

The one or more optical components preferably have an effective focal length selected from the range consisting of: (i) 300-280 mm; (ii) 280-260 mm; (iii) 260-240 mm; (iv) 240-220 mm; (v) 220-200 mm; (vi) 200-180 mm; (vii) 180-160 mm; (viii) 160-140 mm; (ix) 140-120 mm; (x) 120-100 mm; (xi) 100-80 mm; (xii) 80-60 mm; (xiii) 60-40 mm; (xiv) 40-20 mm; and (xv) <20 mm.

The ion source preferably further comprises a laser arranged and adapted to generate the laser beam.

The laser is preferably arranged to emit photons having a wavelength in the range <100 nm, 100-200 nm, 200-300 nm, 300-400 nm, 400-500 nm, 500-600 nm, 600-700 nm, 700-800 nm, 800-900 nm, 900-1000 nm, 1-2 μm, 2-3 μm, 3-4 μm, 4-5 μm, 5-6 μm, 6-7 μm, 7-8 μm, 8-9 μm, 9-10 μm, 10-11 μm and >11 μm.

The one or more optical components are preferably arranged and adapted to direct the laser beam onto the target substrate at an angle θ with respect to the perpendicular to the target substrate, wherein θ is selected from the group consisting of: (i) 0°; (ii) 0-1°; (iii) 1-2°; and (iv) 2-3°.

The one or more optical components are preferably arranged and adapted to direct the laser beam along a longitudinal axis of the one or more ion guides.

The ion source preferably further comprises a mirror and/or a lens for directing the laser beam onto the target substrate and wherein either: (i) the ion path avoids the mirror and/or lens; or (ii) the ion path does not pass through the mirror and/or lens.

The ion source preferably further comprises a device arranged and adapted to maintain the target substrate at a pressure selected from the group consisting of: (i) >100 mbar; (ii) >10 mbar; (iii) >1 mbar; (iv) >0.1 mbar; (v) $>10^{-2}$ mbar; (vi) $>10^{-3}$ mbar; (vii) $>10^{-4}$ mbar; (viii) $>10^{-5}$ mbar; (ix) $>10^{-6}$ mbar; (x) <100 mbar; (xi) <10 mbar; (xii) <1 mbar; (xiii) <0.1 mbar; (xiv) $<10^{-2}$ mbar; (xv) $<10^{-3}$ mbar; (xvi) $<10^{-4}$ mbar; (xvii) $<10^{-5}$ mbar; (xviii) $<10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar.

The one or more optical components preferably comprise one or more focusing lenses.

The one or more optical components preferably comprise one or more mirrors for reflecting the laser beam onto the target substrate.

The ion source preferably further comprises a target substrate.

The target substrate preferably comprises a lower surface on the reverse of the target substrate to the upper surface, and wherein analyte to be ionised is located, in use, on the upper surface.

The target substrate preferably further comprises a matrix. The matrix is preferably selected from the group consisting of: (i) 2,5-dihydroxy benzoic acid; (ii) 3,5-dimethoxy-4-hydroxycinnamic acid; (iii) 4-hydroxy-3-methoxycinnamic acid; (iv) α-cyano-4-hydroxycinnamic acid; (v) Picolinic acid; and (vi) 3-hydroxy picolinic acid.

The one or more ion guides are preferably arranged and adapted to receive ions or packets of ions and to onwardly transmit the ions or packets of ions whilst keeping the ions or packets of ions isolated from each other.

The one or more ion guides preferably comprise a plurality of electrodes.

The one or more ion guides are preferably selected from the group consisting of:

(a) an ion tunnel ion guide comprising a plurality of electrodes, each electrode comprising one or more apertures through which ions are transmitted in use;

(b) an ion funnel ion guide comprising a plurality of electrodes, each electrode comprising one or more apertures through which ions are transmitted in use and wherein a width or diameter of an ion guiding region formed within the ion funnel ion guide increases or decreases along the axial length of the ion guide;

(c) a conjoined ion guide comprising: (i) a first ion guide section comprising a plurality of electrodes each having an aperture through which ions are transmitted and wherein a first ion guiding path is formed within the first ion guide section; and (ii) a second ion guide section comprising a plurality of electrodes each having an aperture through which ions are transmitted and wherein a second ion guiding path is formed within the second ion guide section, wherein a radial pseudo-potential barrier is formed between the first ion guiding path and the second ion guiding path;

(d) a multipole or segmented multipole rod set; or (e) a planar ion guide comprising a plurality of planar electrodes arranged parallel to or orthogonal to a longitudinal axis of the ion guide.

The one or more ion guides preferably comprise two or more discrete ion guiding paths, wherein the laser beam is co-axial with a first ion guiding path and ions are transferred into a second ion guiding path which is not co-axial with the laser beam.

The one or more ion guides preferably comprise a plurality of electrodes each having a first aperture and a second aperture, wherein the first apertures of the electrodes form an optical channel through which the laser beam passes in use.

The second apertures of the electrodes preferably form an ion guiding path through which ions are transmitted in use.

The one or more ion guides are preferably arranged and adapted to confine ions radially within the one or more ion guides.

The ion source preferably further comprises a device arranged and adapted to apply an AC or RF voltage to at least some of the plurality of electrodes in order to create a pseudo-potential which acts to confine ions radially and/or axially within the one or more ion guides.

The one or more ion guides are preferably arranged and adapted to transmit simultaneously multiple groups or packets of ions.

The ion source preferably further comprises a device arranged and adapted to translate a plurality of DC and/or pseudo-potential wells along the length of the one or more ion guides.

The ion source preferably further comprises a device arranged and adapted to apply one or more transient, intermittent or permanent DC voltages to electrodes comprising the one or more ion guides in order to keep multiple groups or packets of ions isolated from each other.

The ion source preferably further comprises a device arranged and adapted to confine axially multiple groups or packets of ions in individual DC and/or pseudo-potential wells within the one or more ion guides.

The multiple groups or packets of ions in the individual DC and/or pseudo-potential wells are preferably prevented from mixing with each other.

The ion source is preferably arranged and adapted to perform ion imaging of the target substrate.

According to another embodiment the ion source is arranged and adapted to perform depth profiling of the target substrate.

The ion source preferably comprises a pulsed ion source.

According to an aspect of the present invention there is provided a Matrix Assisted Laser Desorption Ionisation ("MALDI") or a Laser Desorption Ionisation ion source comprising an ion source as described above.

According to an aspect of the present invention there is provided a mass spectrometer comprising:

an ion source as described above; or a Matrix Assisted Desorption Ionisation ion source or Laser Desorption Ionisation ion source as described above.

The mass spectrometer preferably further comprises a control system arranged and adapted to fragment and/or react and/or photo-dissociate and/or photo-activate one or more groups or packets of ions one or more times to generate first and/or second and/or third and/or subsequent generation fragment ions.

The mass spectrometer preferably further comprises a mass analyser arranged and adapted:

(i) to mass analyse the one or more groups or packets of ions; and/or (ii) to mass analyse first and/or second and/or third and/or subsequent generation fragment ions.

The mass spectrometer preferably further comprises a heating device for heating one or more groups or packets of ions one or more times to aid desolvation of the ions.

According to an aspect of the present invention there is provided a method comprising:

providing a laser, a target substrate and one or more optical components;

focusing a laser beam using the one or more optical components so as to focus the laser beam so as to impinge directly upon an upper surface of the target substrate; and causing the release of ions from the upper surface.

According to the preferred embodiment the one or more optical components preferably have an effective focal length ≤300 mm and wherein the one or more optical components direct the laser beam onto the target substrate at an angle θ with respect to the perpendicular to the target substrate.

According to the preferred embodiment θ≤3°.

The method preferably further comprises receiving ions released from the upper surface of the target substrate in one or more ion guides; and onwardly transmitting the ions along an ion path which substantially bypasses or otherwise avoids the one or more optical components.

The one or more optical components preferably have an effective focal length selected from the range consisting of: (i) 300-280 mm; (ii) 280-260 mm; (iii) 260-240 mm; (iv) 240-220 mm; (v) 220-200 mm; (vi) 200-180 mm; (vii) 180-160 mm; (viii) 160-140 mm; (ix) 140-120 mm; (x) 120-100 mm; (xi) 100-80 mm; (xii) 80-60 mm; (xiii) 60-40 mm; (xiv) 40-20 mm; and (xv) <20 mm.

The laser preferably emits photons having a wavelength in the range <100 nm, 100-200 nm, 200-300 nm, 300-400 nm, 400-500 nm, 500-600 nm, 600-700 nm, 700-800 nm, 800-900 nm, 900-1000 nm, 1-2 μm, 2-3 μm, 3-4 μm, 4-5 μm, 5-6 μm, 6-7 μm, 7-8 μm, 8-9 μm, 9-10 μm, 10-11 μm and >11 μm.

The method preferably further comprises directing the laser beam onto the target substrate at an angle θ with respect to the perpendicular to the target substrate, wherein is selected from the group consisting of: (i) 0°; (ii) 0-1°; (iii) 1-2°; and (iv) 2-3°.

The method preferably further comprises directing the laser beam along a longitudinal axis of the one or more ion guides.

The method preferably further comprises directing the laser beam onto the target substrate using a mirror and/or lens for and wherein either: (i) the ion path avoids the mirror and/or lens; or (ii) the ion path does not pass through the mirror and/or lens.

The method preferably further comprises maintaining the target substrate at a pressure selected from the group consisting of: (i) >100 mbar; (ii) >10 mbar; (iii) >1 mbar; (iv) >0.1 mbar; (v) $>10^{-2}$ mbar; (vi) $>10^{-3}$ mbar; (vii) $>10^{-4}$ mbar; (viii) $>10^{-5}$ mbar; (ix) $>10^{-6}$ mbar; (x) <100 mbar; (xi) <10 mbar; (xii) <1 mbar; (xiii) <0.1 mbar; (xiv) $<10^{-2}$ mbar; (xv) $<10^{-3}$ mbar; (xvi) $<10^{-4}$ mbar; (xvii) $<10^{-5}$ mbar; (xviii) $<10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar.

The one or more optical components preferably comprise one or more focusing lenses.

The one or more optical components preferably comprise one or more mirrors, wherein the method further comprises reflecting the laser beam using the one or more mirrors onto the target substrate.

The method preferably further comprises applying a matrix to the target substrate.

The matrix is preferably selected from the group consisting of: (i) 2,5-dihydroxy benzoic acid; (ii) 3,5-dimethoxy-4-hydroxycinnamic acid; (iii) 4-hydroxy-3-methoxycinnamic acid; (iv) α-cyano-4-hydroxycinnamic acid; (v) Picolinic acid; and (vi) 3-hydroxy picolinic acid.

The method preferably further comprises receiving ions or packets of ions in the one or more ion guides and onwardly transmitting the ions or packets of ions whilst keeping the ions or packets of ions isolated from each other.

The one or more ion guides are preferably selected from the group consisting of:

(a) an ion tunnel ion guide comprising a plurality of electrodes, each electrode comprising one or more apertures through which ions are transmitted in use;

(b) an ion funnel ion guide comprising a plurality of electrodes, each electrode comprising one or more apertures through which ions are transmitted in use and wherein a width or diameter of an ion guiding region formed within the ion funnel ion guide increases or decreases along the axial length of the ion guide;

(c) a conjoined ion guide comprising: (i) a first ion guide section comprising a plurality of electrodes each having an aperture through which ions are transmitted and wherein a first ion guiding path is formed within the first ion guide section; and (ii) a second ion guide section comprising a plurality of electrodes each having an aperture through which ions are transmitted and wherein a second ion guiding path is formed within the second ion guide section, wherein a radial pseudo-potential barrier is formed between the first ion guiding path and the second ion guiding path;

(d) a multipole or segmented multipole rod set; or (e) a planar ion guide comprising a plurality of planar electrodes arranged parallel to or orthogonal to a longitudinal axis of the ion guide.

The one or more ion guides preferably comprise two or more discrete ion guiding paths, wherein the laser beam is co-axial with a first ion guiding path and ions are transferred into a second ion guiding path which is not co-axial with the laser beam.

The one or more ion guides preferably comprise a plurality of electrodes each having a first aperture and a second aperture, wherein the first apertures of the electrodes form an optical channel, wherein the method further comprises passing the laser beam through the optical channel.

The second apertures of the electrodes preferably form an ion guiding path, wherein the method further comprises transmitting ions through the ion guiding path.

The method preferably further comprises confining ions radially within the one or more ion guides.

The method preferably further comprises applying an AC or RF voltage to at least some of the plurality of electrodes in order to create a pseudo-potential which acts to confine ions radially and/or axially within the one or more ion guides.

The method preferably further comprises transmitting simultaneously multiple groups or packets of ions using the one or more ion guides.

The method preferably further comprises translating a plurality of DC and/or pseudo-potential wells along the length of the one or more ion guides.

The method preferably further comprises applying one or more transient, intermittent or permanent DC voltages to electrodes comprising the one or more ion guides in order to keep multiple groups or packets of ions isolated from each other.

The method preferably further comprises axially confining multiple groups or packets of ions in individual DC and/or pseudo-potential wells within the one or more ion guides.

The method preferably further comprises preventing the multiple groups or packets of ions in the individual DC and/or pseudo-potential wells from mixing with each other.

According to an aspect of the present invention there is provided a method of ion imaging a target substrate comprising a method as described above.

According to an aspect of the present invention there is provided a method of depth profiling of a target substrate comprising a method as described above.

According to an aspect of the present invention there is provided a method of Matrix Assisted Laser Desorption Ionisation ("MALDI") ionisation or Laser Desorption Ionisation comprising a method as described above.

According to an aspect of the present invention there is provided a method of mass spectrometry comprising:

a method as described above.

The method of mass spectrometry preferably further comprises fragmenting and/or reacting and/or photo-dissociating and/or photo-activating one or more groups or packets of ions one or more times to generate first and/or second and/or third and/or subsequent generation fragment ions.

The method preferably further comprises:

(i) mass analysing the one or more groups or packets of ions; and/or (ii) mass analysing first and/or second and/or third and/or subsequent generation fragment ions.

The method preferably further comprises heating one or more groups or packets of ions one or more times to aid desolvation of the ions.

The preferred embodiment comprises an apparatus that produces more efficient ionisation within the mass spectrometer.

The preferred embodiment enables more precise spots to be incident upon the sample plate to enhance the resolution of the image.

The preferred embodiment relates to an improved apparatus and method of mass spectrometry, particularly but not exclusively for MALDI techniques.

Accordingly, one aspect of the invention provides an apparatus for mass spectrometry, e.g. a mass spectrometer, comprising a laser arranged to direct, in use, a laser beam along a first axis towards a substrate for creating ions, said first axis being substantially perpendicular to the substrate and an ion guiding device for guiding said ions, wherein the ion guiding device is arranged to surround at least a part of the path of the laser beam.

The apparatus may further comprise an ion inlet for a mass spectrometry system, which may be arranged to receive ions from said ion guiding device, for example wherein said ion guiding device is arranged to guide said ions into said ion inlet along a second axis, e.g. along an ion guiding path at least a portion of which is along a second axis, said second axis preferably being different or offset or perpendicular from said first axis.

Another aspect of the invention provides an apparatus for mass spectrometry, e.g. a mass spectrometer, comprising: a laser arranged to direct, in use, a laser beam along a first axis towards a substrate for creating ions, said first axis being substantially perpendicular to the substrate and an ion guiding device for guiding said ions along an ion path, e.g. to an ion inlet for or of the or a mass spectrometry system, at least a portion of said ion path being along a second axis, wherein said first axis and said second axis are different or offset or perpendicular relative to each other.

In some embodiments, said first axis and said second axis are substantially parallel. In other embodiments, said first axis and said second axis intersect with each other.

In a preferred embodiment, the ion guiding device comprises an RF ion guiding device and/or a conjoined ion guide and/or an ion funnel or funnelling device and/or a transient DC voltage, for example to propel said ions through said ion guiding device, and/or a permanent DC voltage to propel said ions through said ion guiding device and/or an intermittent DC voltage to propel said ions through said ion guiding device.

The apparatus may further comprise a Field Asymmetric Ion Mobility Spectrometer ("FAIMS") portion, section, stage or device downstream of said ion guiding device or comprised within said ion guiding device and/or an Ion Mobility Spectrometer ("IMS") portion, section, stage or device downstream of said ion guiding device or comprised within said ion guiding device and/or a Quadrupole mass filter downstream of said ion guiding device and/or a collision cell downstream of said ion guiding device.

The laser may be pulsed and/or may be from the group comprising: Nitrogen, Nd:YAG, CO2, Er:YAG, UV and IR. The pulse frequency of the laser may be one of the groups comprising 1-10 Hz, 10-100 Hz, 100-1000 Hz, 1000-10000 Hz, 10000-100000 Hz.

The substrate may further comprise a matrix, which may be selected from the group comprising: 2,5-dihydroxy benzoic acid, 3,5-dimethoxy-4-hydroxycinnamic acid, 4-hydroxy-3-methoxycinnamic acid, $\alpha$-cyano-4-hydroxycinnamic acid, Picolinic acid, 3-hydroxy picolinic acid.

The ion guiding device may contain a collision gas and/or one or more, e.g. any, ions within said ion guiding device are exposed to a source of heat, which may comprise providing a heated collision gas within said ion guiding device or said source of heat comprises a radiant heat source. The source of heat may further comprise the provision of a laser to assist the desolvation of said ions within said ion guiding device.

Another aspect of the invention provides a method of mass spectrometry comprising the steps of: providing a substrate having an analyte thereon, directing a laser along a first axis substantially perpendicular to the substrate to produce analyte ions and guiding analyte ions using an ion guide or guiding means or guiding device, wherein said ion guide or guiding means or guiding device is arranged to surround at least a part of the path of the laser beam.

The method may further comprising providing an ion inlet for a mass spectrometry system arranged to receive ions from said ion guide or guiding means or guiding device wherein said ion guide or guiding means or guiding device may be arranged to guide said ions into said ion inlet along a second axis, e.g. along an ion guiding path at least a portion of which is along a second axis, said second axis preferably being different from said first axis.

A further aspect of the invention provides a method of mass spectrometry comprising the steps of: providing a substrate having an analyte thereon, directing a laser along a first axis substantially perpendicular to the substrate to produce analyte ions, guiding analyte ions, e.g. using an ion guide or guiding means or guiding device, along an ion path, at least a portion of which is along a second axis, wherein said first axis and said second axis are different or offset or perpendicular relative to each other.

In some embodiments, said first axis and said second axis are parallel. In other embodiments, said first axis and said second axis intersect with each other.

The ion guide or guiding means or guiding device may comprise an RF ion guide or guiding means or guiding device or guide and/or a conjoined ion guide or guiding means or guiding device or guide and/or an ion funnel or funnelling means or arrangement. The method may comprise a transient DC voltage being applied to, by or within the ion guide or guiding means or guiding device to propel said ions through said ion guide or guiding means or guiding device and/or a permanent DC voltage being applied to, by or within the ion guide or guiding means or guiding device to propel said ions through said ion guide or guiding means or guiding device and/or an intermittent DC voltage being applied to, by or within the ion guide or guiding means or guiding device to propel said ions through said ion guide or guiding means or guiding device.

The method may further comprise providing a FAIMS portion, section, stage or device downstream of said ion guide or guiding means or guiding device and/or an IMS device downstream of said ion guide or guiding means or guiding device and/or a Quadrupole mass filter downstream of said ion guide or guiding means or guiding device and/or a collision cell downstream of said ion guide or guiding means or guiding device.

The step of directing the laser may comprise directing a pulsed laser, e.g. directing laser pulses, and/or the laser may be from the group comprising: Nitrogen, Nd:YAG, $CO_2$, Er:YAG, UV and IR. The laser may have a pulse frequency selected from the groups comprising 1-10 Hz, 10-100 Hz, 100-1000 Hz, 1000-10000 Hz, 10000-100000 Hz.

The method may further comprise providing a matrix upon said substrate, which matrix may be from the group comprising: 2,5-dihydroxy benzoic acid, 3,5-dimethoxy-4-hydroxycinnamic acid, 4-hydroxy-3-methoxycinnamic acid, α-cyano-4-hydroxycinnamic acid, Picolinic acid, 3-hydroxy picolinic acid.

The method may further comprise exposing ions in the ion guiding device to a source of heat, which source of heat may comprise providing a heated collision gas within said ion guiding device and/or providing a radiant heat source and/or providing a laser to assist the desolvation of said ions within said ion guiding device.

Another aspect of the invention provides an apparatus arranged and adapted to perform a method as described above.

The ion guiding device may comprise a travelling wave guide or guiding device and/or may be arranged or configured to generate, in use, a DC potential that travels along a portion thereof. Most if not all of the electrodes forming the ion guide may be connected to an AC or RF voltage supply. The resulting AC or RF electric field may be configured to radially confine ions within the ion guide by creating a pseudo-potential well. The AC or RF voltage supply may, but do not necessarily, output a sinusoidal waveform, and according to some embodiments a non-sinusoidal RF waveform such as a square wave may be provided. Preferably, at least some of the electrodes are connected to both a DC and an AC or RF voltage supply.

A repeating pattern of DC electrical potentials may be superimposed along the length of the ion guide such as to form a periodic waveform. The waveform may be caused to travel along the ion guide in the direction in which it is required to move the ions at constant velocity. In some embodiments, a gas is present, e.g. by which the ion motion will be dampened by the viscous drag of the gas. The ions may therefore drift forwards with the same velocity as that of the travelling waveform, e.g. and ions may exit from the ion guide with substantially the same velocity, irrespective of their mass.

The ion guide preferably comprises a plurality of segments. The ion guide is preferably segmented in the axial direction such that independent transient DC potentials can be applied, preferably independently, to each segment. The DC travelling wave potential is preferably superimposed on top of the AC or RF radially confining voltage and any constant or underlying DC offset voltage which may be applied to the segment. The DC potentials at which the various segments are maintained are preferably changed temporally so as to generate a travelling DC potential wave in the axial direction.

At any instant in time, a moving DC voltage gradient may be generated between segments so as to push or pull the ions in a certain direction. As the DC voltage gradient moves along the ion guide, so do the ions.

The DC voltage applied to each of the segments may be independently programmed to create a required waveform. The individual DC voltages on each of the segments are preferably programmed to change in synchronism such that the waveform is maintained but shifted in the direction in which it is required to move the ions.

The DC voltage applied to each segment may be programmed to change continuously or in a series of steps. The sequence of DC voltages applied to each segment may repeat at regular intervals, or at intervals that may progressively increase or decrease.

Preferred configurations and/or features of the ion guide or guiding device are disclosed in U.S. Pat. No. 6,812,453, the entire contents of which are incorporated herein by reference. Those skilled in the art will appreciate readily the synergistic combinations of ion guide features disclosed therein that would provide advantages in light of the present disclosure.

Preferably, the ion guiding device comprises a first ion guide including a first plurality of electrodes; and/or a second ion guide including a second plurality of electrodes; and/or a first device arranged and adapted to create one or more barriers, for example pseudo-potential barriers, at one or more points along the length of the ion guiding device, e.g. between a first ion guiding path of the first ion guide and a second ion guiding path of the second ion guide; and/or a second device arranged and adapted to transfer ions from the or a first ion guiding path of the first ion guide into the or a second ion guiding path of the second ion guide, for example by urging ions across one or more barriers or pseudo-potential barriers.

In some embodiments, each electrode of one or both of the first and second ion guides comprises at least one aperture through which ions are transmitted in use and/or wherein the or an ion guiding path is formed along or within the ion guide.

Ions may be transferred radially or with a non-zero radial component of velocity across one or more radial or longitudinal barriers, e.g. pseudo-potential barriers, disposed between the first ion guide and the second ion guide. At least a portion of the first and second ion guide and/or at least a portion of the first and second ion guiding path is or are substantially parallel to one another. Ions may be transferred from the first ion guide to the second ion guide and/or from the second ion guide to the first ion guide one or more times. Ions may, for example, be repeatedly switched back and forth between the two or more ion guides.

In some embodiments, the first plurality of electrodes comprises one or more first rod sets, for example wherein a first ion guiding path is formed along, or within the first ion guide. Additionally or alternatively, the second plurality of electrodes may comprise one or more second rod sets, for example wherein a second different ion guiding path is formed along or within the second ion guide. In some embodiments, the first ion guide and/or the second ion guide comprise one or more axially segmented rod set ion guides. The first ion guide and/or the second ion guide may comprise one or more segmented quadrupole, hexapole or octapole ion guides or an ion guide comprising four or more segmented rod sets. The first ion guide and/or the second ion guide may comprise a plurality of electrodes having a cross-section selected from the group consisting of: (i) an approximately or substantially circular cross-section; (ii) an approximately or substantially hyperbolic surface; (iii) an arcuate or part-circular cross-section; (iv) an approximately or substantially rectangular cross-section; and (v) an approximately or substantially square cross-section. The first ion guide and/or the second ion guide comprise or further comprise a plurality of ring electrodes arranged around the one or more first rod sets and/or the one or more second rod sets. The first ion guide and/or the second ion guide comprise 4 to 30 or more rod electrodes. Adjacent or neighbouring rod electrodes may be maintained at opposite phase of an AC or RF voltage.

According to some embodiments, the first plurality of electrodes are arranged in a plane in which ions travel in use, for example wherein a first ion guiding path is formed along or within the first ion guide. The second plurality of electrodes may be arranged in a plane in which ions travel in use, for example wherein a second different ion guiding path is formed along or within the second ion guide.

In some embodiments, the first ion guide and/or the second ion guide comprises a stack or array of planar, plate, mesh or curved electrodes, wherein the stack or array of planar, plate, mesh or curved electrodes may comprise two or more, e.g. a plurality, of planar, plate, mesh or curved electrodes. The first ion guide and/or the second ion guide may be axially segmented, e.g. so as to comprise two or more, e.g. a plurality, of axial segments, for example wherein at least some of the first plurality of electrodes in an axial segment and/or at least some of the second plurality of electrodes in an axial segment are maintained in use at the same DC voltage.

The first device may be arranged and adapted to create one or more radial or longitudinal or non-axial pseudo-potential barriers at one or more points along the length of the ion guiding device between the first ion guiding path and the second ion guiding path. The second device may be arranged and adapted to transfer ions radially or with a non-zero radial component of velocity and an axial component of velocity from the first ion guiding path into the second ion guiding path, for example wherein the ratio of the radial component of velocity to the axial component of velocity is between 0.1 and 10.

In some embodiments, the first ion guide and the second ion guide are conjoined, merged, overlapped or open to one another for at least some of the length of the first ion guide and/or the second ion guide. Ions may be transferred radially between the first ion guide or the first ion guiding path and the second ion guide or the second ion guiding path over at least some of the length of the first ion guide and/or the second ion guide. One or more radial or longitudinal pseudo-potential barriers may be formed, in use, which separate the first ion guide or the first ion guiding path from the second ion guide or the second ion guiding path along at least some of the length of the first ion guide and/or the second ion guide. A first pseudo-potential valley or field may be formed within the first ion guide and a second pseudo-potential valley or field is formed within the second ion guide, for example wherein a pseudo-potential barrier separates the first pseudo-potential valley from the second pseudo-potential valley. Ions may be confined radially within the ion guiding device by either the first pseudo-potential valley or the second pseudo-potential valley. At least some ions may be urged or caused to transfer across the pseudo-potential barrier. The degree of overlap or openness between the first ion guide and the second ion guide may remain constant or vary, increase, decrease, increase in a stepped or linear manner or decrease in a stepped or linear manner along the length of the first and second ion guides.

In some embodiments, one or more of the first plurality of electrodes are maintained in a mode of operation at a first potential or voltage and/or one or more of the second plurality of electrodes are maintained in a mode of operation at a second potential or voltage, which second potential or voltage may be different from the first potential or voltage. A potential difference may be maintained in a mode of operation between one or more of the first plurality of electrodes and one or more of the second plurality of electrodes. The first plurality of electrodes or at least some of the first plurality of electrodes may be maintained in use at substantially the same first DC voltage and/or the second plurality of electrodes or at least some of the second plurality of electrodes may be maintained in use at substantially the same second DC voltage and/or at least some of the first plurality of electrodes and/or the second plurality of electrodes may be maintained at substantially the same DC or DC bias voltage or are maintained at substantially different DC or DC bias voltages.

The first ion guide may comprise a first central longitudinal axis and the second ion guide preferably comprises a second central longitudinal axis, for example wherein the first central longitudinal axis is substantially parallel with the second central longitudinal axis for at least some of the length of the first ion guide and/or the second ion guide and/or the first central longitudinal axis is not co-linear or co-axial with the second central longitudinal axis for at least some of the length of the first ion guide and/or the second ion guide and/or the first central longitudinal axis may be spaced at a constant distance or remains equidistant from the second central longitudinal axis for at least some of the length of the first ion guide and/or the second ion guide. The first central longitudinal axis may be a mirror image of the second central longitudinal axis for at least some of the length of the first ion guide and/or the second ion guide and/or the first central longitudinal axis may substantially track, follow, mirror or run parallel to and/or alongside the second central longitudinal axis for at least some of the length of the first ion guide and/or the second ion guide. The first central longitudinal axis may converge towards or diverge away from the second central longitudinal axis for at least some of the length of the first ion guide and/or the second ion guide and/or the first central longitudinal axis and the second central longitudinal may form a X-shaped or Y-shaped coupler or splitter ion guiding path. One or more crossover regions, sections or junctions may be arranged between the first ion guide and the second ion guide, for example wherein at least some ions may be transferred or are caused to be transferred from the first ion guide into the second ion guide and/or wherein at least some ions may be transferred from the second ion guide into the first ion guide.

The ion guiding device may further comprise a first AC or RF voltage supply for applying a first AC or RF voltage to at least some of the first plurality of electrodes and/or the second plurality of electrodes. The first AC or RF voltage may have an amplitude of <50 V peak to peak, >1000 V peak to peak or any interval, e.g. any 50 V interval, therebetween. The first AC or RF voltage may have a frequency of <100 kHz, >10.0 MHz or any interval, e.g. any interval of 100 kHz, 500 kHz or more or less, therebetween.

The first AC or RF voltage supply may be arranged to supply adjacent or neighbouring electrodes of the first plurality of electrodes with opposite phases of the first AC or RF voltage and/or the first AC or RF voltage supply may be arranged to supply adjacent or neighbouring electrodes of the second plurality of electrodes with opposite phases of the first AC or RF voltage and/or the first AC or RF voltage may generates one or more radial pseudo-potential wells which act to confine ions radially within the first ion guide and/or the second ion guide.

According to an embodiment, the ion guiding device further comprises a third device arranged and adapted to progressively increase, progressively decrease, progressively vary, scan, linearly increase, linearly decrease, increase in a stepped, progressive or other manner or decrease in a stepped, progressive or other manner the amplitude of the first AC or RF voltage.

The ion guiding device may further comprise a second AC or RF voltage supply, e.g. for applying a second AC or RF voltage to at least some of the first plurality of electrodes and/or the second plurality of electrodes. The second AC or RF voltage may have an amplitude of <50 V peak to peak, >1000 V peak to peak or any interval, e.g. any 50 V interval, therebetween. The second AC or RF voltage may have a frequency <100 kHz, >10.0 MHz or any interval, e.g. any interval of 100 kHz, 500 kHz or more or less, therebetween.

The second AC or RF voltage supply may be arranged to supply adjacent or neighbouring electrodes of the first plurality of electrodes with opposite phases of the second AC or RF voltage and/or the second AC or RF voltage supply may be arranged to supply adjacent or neighbouring electrodes of the second plurality of electrodes with opposite phases of the second AC or RF voltage and/or the second AC or RF voltage may generate one or more radial pseudo-potential wells which act to confine ions radially within the first ion guide and/or the second ion guide.

The ion guiding device may further comprise a fourth device arranged and adapted to progressively increase, progressively decrease, progressively vary, scan, linearly increase, linearly decrease, increase in a stepped, progressive or other manner or decrease in a stepped, progressive or other manner the amplitude of the second AC or RF voltage.

A non-zero axial and/or radial DC voltage gradient may be maintained in use across or along one or more sections or portions of the first ion guide and/or the second ion guide. According to an embodiment the ion guiding device further comprises a device for driving or urging ions upstream and/or downstream along or around at least some of the length or ion guiding path of the first ion guide and/or the second ion guide. The device may comprise a device for applying one more transient DC voltages or potentials or DC voltage or potential waveforms to at least some of the first plurality of electrodes and/or the second plurality of electrodes in order to urge at least some ions downstream and/or upstream along at least some of the axial length of the first ion guide and/or the second ion guide. The device may comprise a device arranged and adapted to apply two or more phase-shifted AC or RF voltages to electrodes forming the first ion guide and/or the second ion guide in order to urge at least some ions downstream and/or upstream along at least some of the axial length of the first ion guide and/or the second ion guide. The device may comprise a device arranged and adapted to apply one or more DC voltages to electrodes forming the first ion guide and/or the second ion guide in order create or form an axial and/or radial DC voltage gradient which has the effect of urging or driving at least some ions downstream and/or upstream along at least some of the axial length of the first ion guide and/or the second ion guide.

The ion guiding device may further comprise a fifth device arranged and adapted to progressively increase, progressively decrease, progressively vary, scan, linearly increase, linearly decrease, increase in a stepped, progressive or other manner or decrease in a stepped, progressive or other manner the amplitude, height or depth of the one or more transient DC voltages or potentials or DC voltage or potential waveforms.

The ion guiding device preferably further comprises sixth device arranged and adapted to progressively increase, progressively decrease, progressively vary, scan, linearly increase, linearly decrease, increase in a stepped, progressive or other manner or decrease in a stepped, progressive or other manner the velocity or rate at which the one or more transient DC voltages or potentials or DC voltage or potential waveforms are applied to the electrodes.

According to an embodiment the ion guiding device further comprises means arranged to maintain a constant non-zero DC voltage gradient along at least some of the length or ion guiding path of the first ion guide and/or the second ion guide.

The first ion guide and/or the second ion guide may be arranged and adapted to receive a beam or group of ions and to convert or partition the beam or group of ions such that at least 1, 2, 3, 4, 5, 6, 7, 8, 9, 10, 11, 12, 13, 14, 15, 16, 17, 18, 19 or 20 separate packets of ions are confined and/or isolated within the first ion guide and/or the second ion guide at any particular time, and wherein each packet of ions is separately confined and/or isolated in a separate axial potential well formed in the first ion guide and/or the second ion guide. According to an embodiment: (a) one or more portions of the first ion guide and/or the second ion guide may comprise an ion mobility spectrometer or separator portion, section or stage wherein ions are caused to separate temporally according to their ion mobility in the ion mobility spectrometer or separator portion, section or stage; and/or (b) one or more portions of the first ion guide and/or the second ion guide may comprise a Field Asymmetric Ion Mobility Spectrometer ("FAIMS") portion, section or stage wherein ions are caused to separate temporally according to their rate of change of ion mobility with electric field strength in the Field Asymmetric Ion Mobility Spectrometer ("FAIMS") portion, section or stage; and/or (c) in use a buffer gas is provided within one or more sections of the first ion guide and/or the second ion guide; and/or (d) in a mode of operation ions are arranged to be collisionally cooled without fragmenting upon interaction with gas molecules within a portion or region of the first ion guide and/or the second ion guide; and/or (e) in a mode of operation ions are arranged to be heated upon interaction with gas molecules within a portion or region of the first ion guide and/or the second ion guide; and/or (f) in a mode of operation ions are arranged to be fragmented upon interaction with gas molecules within a portion or region of the first ion guide and/or the second ion guide; and/or (g) in a mode of operation ions are arranged to unfold or at least partially unfold upon interaction with gas molecules within the first ion guide and/or the second ion guide; and/or (h) ions are trapped axially within a portion or region of the first ion guide and/or the second ion guide.

The first ion guide and/or the second ion guide may further comprise a collision, fragmentation or reaction device, wherein in a mode of operation ions are arranged to be fragmented within the first ion guide and/or the second ion guide by: (i) Collisional Induced Dissociation ("CID"); (ii) Surface Induced Dissociation ("SID"); (iii) Electron Transfer Dissociation ("ETD"); (iv) Electron Capture Dissociation ("ECD"); (v) Electron Collision or Impact Dissociation; (vi)

Photo Induced Dissociation ("PID"); (vii) Laser Induced Dissociation; (viii) infrared radiation induced dissociation; (ix) ultraviolet radiation induced dissociation; (x) thermal or temperature dissociation; (xi) electric field induced dissociation,—(xii) magnetic field induced dissociation; (xiii) enzyme digestion or enzyme degradation dissociation; (xiv) ion-ion reaction dissociation; (xv) ion-molecule reaction dissociation; (xvi) ion-atom reaction dissociation; (xvii) ion-metastable ion reaction dissociation; (xviii) ion-metastable molecule reaction dissociation; (xix) ion-metastable atom reaction dissociation; and (xx) Electron Ionisation Dissociation ("EID").

According to another aspect of the present invention there is provided a computer readable medium comprising computer executable instructions stored on the computer readable medium, the instructions being arranged to be executable by a control system of a mass spectrometer comprising an ion guiding device comprising a first ion guide comprising a first plurality of electrodes and a second ion guide comprising a second plurality of electrodes, to cause the control system: (i) to create one or more pseudo-potential barriers at one or more points along the length of the ion guiding device between a first ion guiding path and a second ion guiding path; and (ii) to transfer ions from the first ion guiding path into the second ion guiding path by urging ions across the one or more pseudo-potential barriers. The computer readable medium is preferably selected from the group consisting of: (i) a ROM; (ii) an EAROM; (iii) an EPROM; (iv) an EEPROM; (v) a flash memory; and (vi) an optical disk.

In another optional feature of the invention, the ion guiding device comprises two or more parallel conjoined ion guides. The two or more parallel conjoined ion guides may comprise a first ion guide and a second ion guide, wherein the first ion guide and/or the second ion guide are selected from the group consisting of: (i) an ion tunnel ion guide comprising a plurality of electrodes having at least one aperture through which ions are transmitted in use; and/or (ii) a rod set ion guide comprising a plurality of rod electrodes; and/or (iii) a stacked plate ion guide comprising a plurality of plate electrodes arranged generally in the plane in which ions travel in use.

Embodiments are contemplated wherein the ion guiding device may comprise a hybrid arrangement wherein one of the ion guides comprises, for example, an ion tunnel and the other ion guide comprises a rod set or stacked plate ion guide.

Preferable embodiments and features of the ion guiding device are described in WO2009/037483, the entire contents are incorporated herein by reference. Those skilled in the art will appreciate readily the synergistic combinations of ion guide features disclosed therein that would provide advantages in light of the present disclosure.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; and (xx) a Glow Discharge ("GD") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap;

(iv) a Penning ion trap; (v) an ion trap; (vi) a magnetic sector mass filter; (vii) a Time of Flight mass filter; and (viii) a Wein filter; and/or (k) a device or ion gate for pulsing ions; and/or (l) a device for converting a substantially continuous ion beam into a pulsed ion beam.

The mass spectrometer may further comprise either:

(i) a C-trap and an orbitrap (RTM) mass analyser comprising an outer barrel-like electrode and a coaxial inner spindle-like electrode, wherein in a first mode of operation ions are transmitted to the C-trap and are then injected into the orbitrap (RTM) mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the orbitrap (RTM) mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENTS

Figure 1:
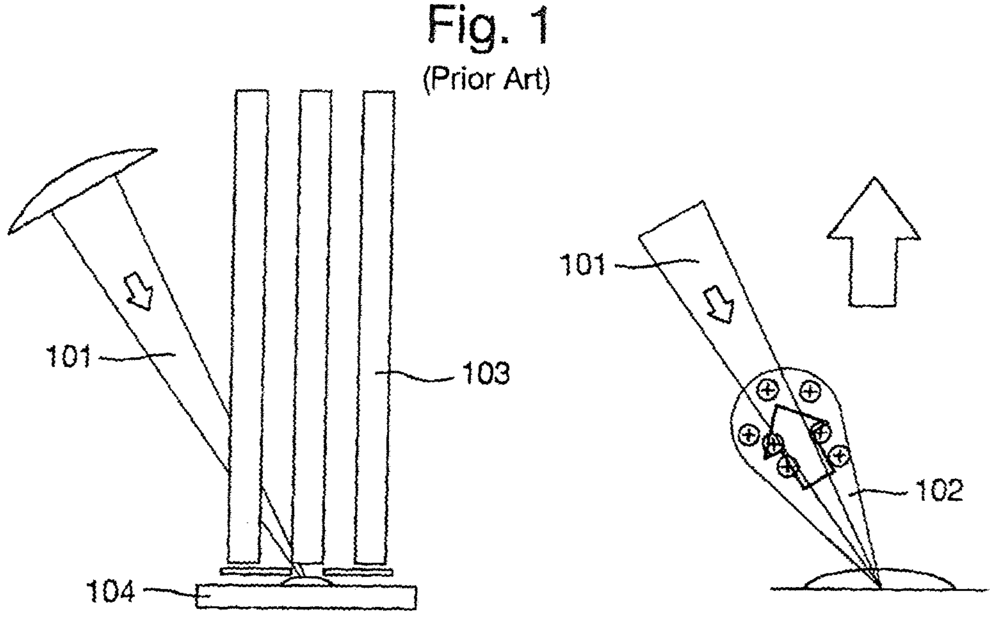
Fig. 1 (Prior Art)
FIG. 1 shows a known arrangement wherein a MALDI sample is illuminated by a laser beam.

A known arrangement will first be described. FIG. 1 shows a known arrangement wherein a MALDI sample is illuminated by a laser beam 101. The angle of incidence of the beam determines the dominant direction of emission of the resulting plume of material 102. A multipole ion guide 103 is located adjacent the target substrate and has an ion guiding region.

The plume 102 and the analyte ions formed subsequent to irradiation by the laser 101 tend to expand in a direction towards the incident laser beam 101. This is due to the inhomogeneous surface topography of the MALDI sample and crystalline matrix. Reference is made to P. Aksouh et al. Rapid Commun. Mass Spectrometry, 9 (1995) 515.

The ions formed in the MALDI plume must be transferred into the analyser requiring electrodes to be located in close proximity to the sample target. In high vacuum MALDI instruments, the requirement for electrostatic lenses to be also arranged along the ion optic axis to enable ion acceleration orthogonal to the sample plate 104 generally precludes the ability to locate laser optics along the same path. Consequently, commercial MALDI mass spectrometers are designed with the laser incident at a small but non-zero angle of incidence.

With intermediate pressure MALDI, wherein a hexapole RF guide 103 is used to transfer ions, the RF devices prevent the possibility of locating laser optics designed specifically to provide orthogonal illumination. Furthermore, the RF lenses limit the possibility of providing a final focus lens close to the MALDI sample plate. Similar constraints also apply to atmospheric pressure MALDI instrumentation.

Figure 2:
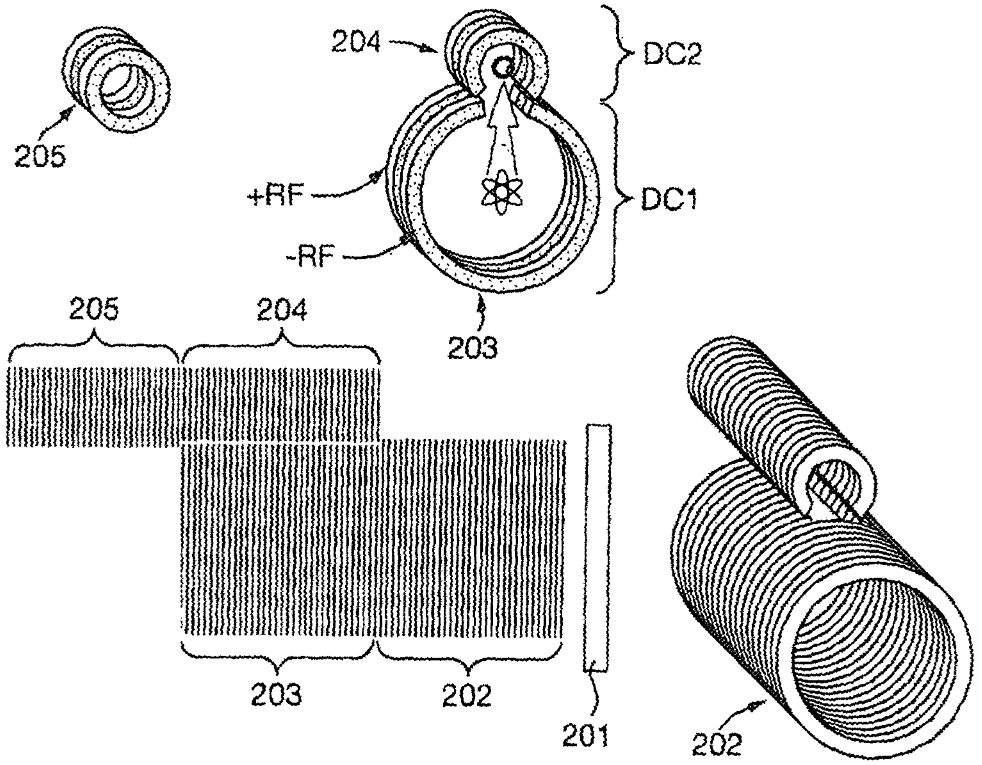
FIG. 2 illustrates the configuration of a three stage ion guide.

FIG. 2 illustrates the configuration of a three stage ion guide, showing the target plate 201, an initial large aperture ring stack 202, a large aperture ring stack 203 conjoined with a small aperture ring stack 204 and a small aperture ion guide 205. It also shows the applied RF and DC voltages on the conjoined elements and indicates the direction of drift of the ion cloud within the conjoined elements from the large aperture to the small aperture.

Figure 3:
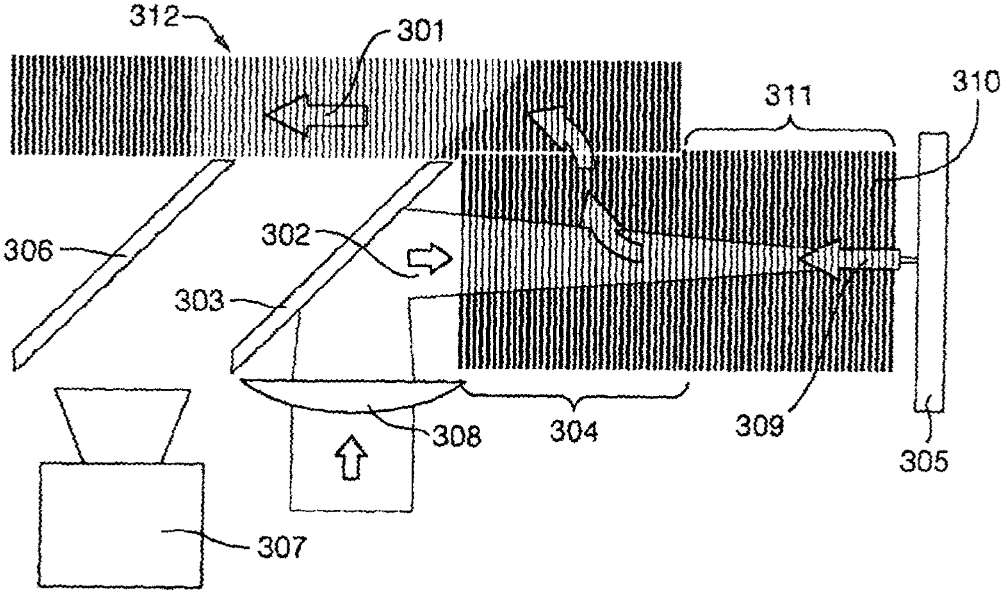
FIG. 3 shows a preferred embodiment by which the laser pulse is directed through a lens and onto the target sample plate.

FIG. 3 shows a preferred embodiment by which the laser pulse 302 is directed through a lens 308 and onto the target sample plate 305 using a dichroic mirror 303 to produce an ion beam 309 which is subsequently directed away from the laser optic axis. The sample plate 305 is viewed by a camera 307 through the laser mirror.

In the preferred embodiment, the laser may be provided on or along a first path and the ion confinement device surrounds at least a part of that first path.

In the most preferred embodiment of the current invention a mass spectrometer is provided for use in MALDI MS, using a combination of mirrors 303 to direct the laser pulse 302 from the laser head (not shown) to the sample target plate 305; an optical lens 308 to focus the laser radiation onto the laser target plate 305; an RF guide 310 is arranged to collect and guide the ions generated in the MALDI plume, configured in such a way as to direct the ions along a path 301 away from the optic axis of the incident laser pulse 302. The laser is directed orthogonal to the surface of the target sample plate 305.

The RF guide preferably comprises three separate regions: a first 311 large aperture stack of ring electrodes arranged such that the RF applied each sequential ring is in anti-phase with its immediate neighbours; a second region 304 comprising of a large and small aperture conjoined RF guides both guides arranged such that the RF applied each sequential ring is in anti-phase with its immediate neighbours and a DC potential applied between the two guides so as to drive ions across the radial pseudo-potential barrier which separates the two ion guiding regions; and a third region 312 constructed using a small aperture RF guide arranged such that the RF applied each sequential ring is in anti-phase with its immediate neighbours.

A DC offset between the two conjoined ion guides provides a method of directing the ion beam away from the optic axis of the incident laser beam.

In one embodiment of the invention a DC potential difference, or a DC pulsed square wave applied sequentially along the length of the ion guide, provides a mechanism to propagate ions along the ion guide. In this embodiment of the invention the pulsed DC square wave may be arranged to collect and confine ions created from one or more pulses of the laser on an individual co-ordinate and transfer them into the mass spectrometer in one single packet, and keeping them segregated from the next packet. The DC square wave may be arranged to push sets of ions from the selected one or more pulses of the laser through the device and into the mass analysis section of the instrument. In the preferred embodiment, this results in ions from each packet within the mass spectrometer to be identified as being from one individual spot upon the target plate.

In one preferred embodiment, two packets of ions may be produced from the same spot, each packet may contain the ions produced from one or more pulses on the same co-ordinate upon the target. The two packets may both be transferred through the ion confinement means, and the first set of ions passed straight through a collision cell following the ion confinement device. The ions may be propelled through the collision cell with sufficiently low energy that there will be few, or no fragmentation of the ions within the packet. The second set of ions may also be passed through the ion confinement device and into the collision cell. However, in this instance, the ions may be passed through the collision cell with higher energy such that all, most, or a substantial number of the ions will be fragmented giving daughter ions. Both these packets of ions may then pass through to the analyser for analysis to produce a mass spectrum. This may allow the parent and daughter ion mass spectra to be performed on ions from the same co-ordinate on the sample plate. Once the two packets have been created in the ion confinement device, the sample plate may be moved on to the next co-ordinate where the laser may again be pulsed to create a set of ions from the next co-ordinate. These ions may be similarly separated from the previous sets of ions, and similarly, two packets may be formed in the same way as for the previous co-ordinate.

In the preferred embodiment the ion confinement device comprises an RF ion confinement device.

In the preferred embodiment the ions created from the first co-ordinate and the ions created from the second co-ordinate are segregated by transient DC voltages In a less preferred embodiment the ions created from the first co-ordinate and the ions created from the second co-ordinate are segregated by one or more permanent DC voltages In a less preferred embodiment the ions created from the first co-ordinate and the ions created from the second co-ordinate are segregated by one or more intermittent DC voltages.

In a less preferred embodiment the ions may be created by a pulsed laser. In one embodiment of the invention, is two or more pulses of a laser on the first co-ordinate are segregated within one packet In another embodiment of the invention, the ions produced from each pulse of a laser on the first co-ordinate are segregated from each other The laser may be from the group comprising:—insert laser types including UV and IR The laser may have a pulse frequency selected from the following ranges 1-10 Hz, 10-100 Hz, 100-1000 Hz, 1000-10000 Hz, 10000-100000 Hz.

In less preferred embodiments a the energy may be provided by one or more of firing a laser at the back of the sample plate (as in laser spray), firing a ball bearing at the sample plate, heating a specific spot on the sample plate, a piezoelectric excitement of a spot on the sample plate.

Preferably, the surface may also comprise a matrix to assist desorption and ionisation of the sample. The matrix may be from the group comprising: 2,5-dihydroxy benzoic acid, 3,5-dimethoxy-4-hydroxycinnamic acid, 4-hydroxy-3-methoxycinnamic acid, α-cyano-4-hydroxycinnamic acid, Picolinic acid, 3-hydroxy picolinic acid.

In one embodiment of the invention the ion confinement device may contain a collision gas, the collision gas may be used to cool the ions produced by the laser pulse, to enable the ions to be more easily handled throughout the mass spectrometer. In a less preferred embodiment any fragmentation may be performed within the ion confinement device.

In one embodiment the packets of ions segregated in the ion confinement device may be exposed to a source of heat, in order to assist the desolvation of the ions. In the preferred embodiment the source of heat may be a heated collision gas within the ion confinement device. In less preferred embodiments, the source of heat comprises a radiant heat source. In a further embodiment of the invention, a laser may be provided to assist desolvation of ions within the ion confinement device.

The preferred embodiment of the invention include the collection of ions in packets from particular spots upon the surface of the sample plate. It would be apparent to the skilled person that this it may be possible to practice the current invention without collecting packets of ions from particular spots. It may be possible to do imaging experiments where using the invention without requiring the segregation of different ions. Methods of acquiring ions in conventional instruments may be utilised with the current invention. The benefits of the segregation would be apparent to a person skilled in the art because this enables greater certainty of the position from which ions that are generated in the source originated from upon the surface.

In one embodiment, a FAIMS separation device may be provided downstream of the ion confinement device.

In one embodiment, a IMS separation device may be provided downstream of the ion confinement device.

In one embodiment a mass filter may be provided downstream of the ion confinement device. In one preferred embodiment, this may be a quadrupole In a preferred embodiment, the fragmentation of ions may be performed in a collision cell downstream of the ion confinement device.

In the preferred embodiment, once ions have been collected from one co-ordinate, the surface may be moved relative to the energy source to enable the provision of energy to different co-ordinates.

Preferably, the spectra produced from packets of ions from each co-ordinate may be correlated with the co-ordinates upon the sample surface from which the ions are produced.

Figure 4:
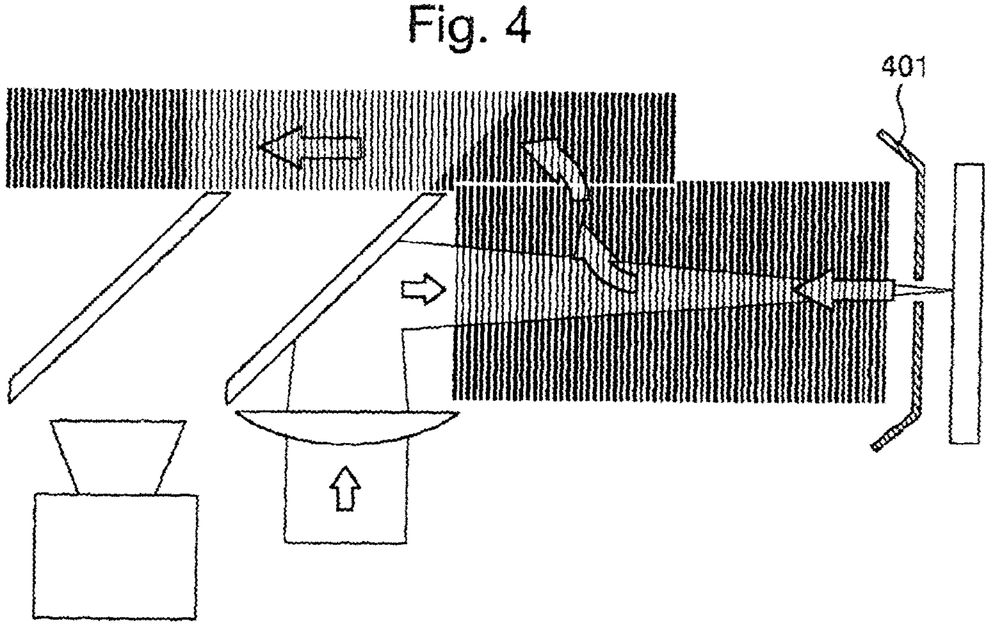
FIG. 4 illustrates the inclusion of an aperture between the sample plate and the RF ion guide.

FIG. 4 illustrates a second embodiment of the invention. In this embodiment, the inclusion of an aperture 401 between the sample plate and the RF ion guide allowing differential pumping to create two different pressure regions.

Figure 5:
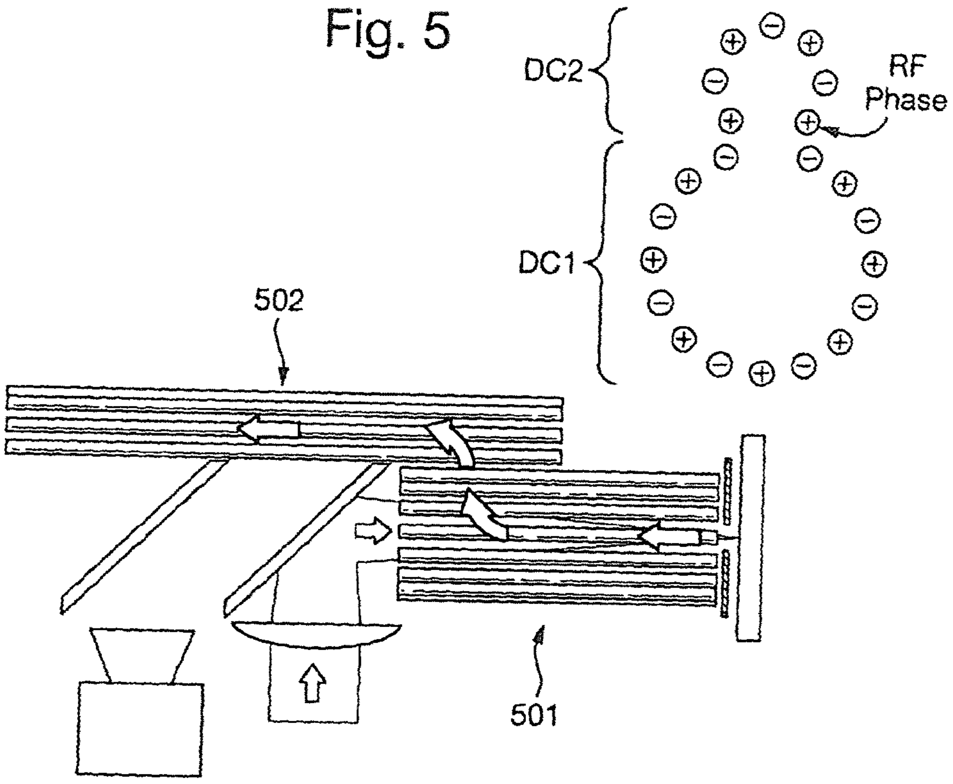
FIG. 5 is a schematic showing an alternative embodiment.

FIG. 5 is a schematic showing an alternative arrangement where RF rod sets 401,402 are used to generate the pseudo-potential well required to guide ions around the laser optic axis. The applied RF and DC voltages RF and DC voltages on the conjoined ion guide rod sets is also indicated.

Figure 6:
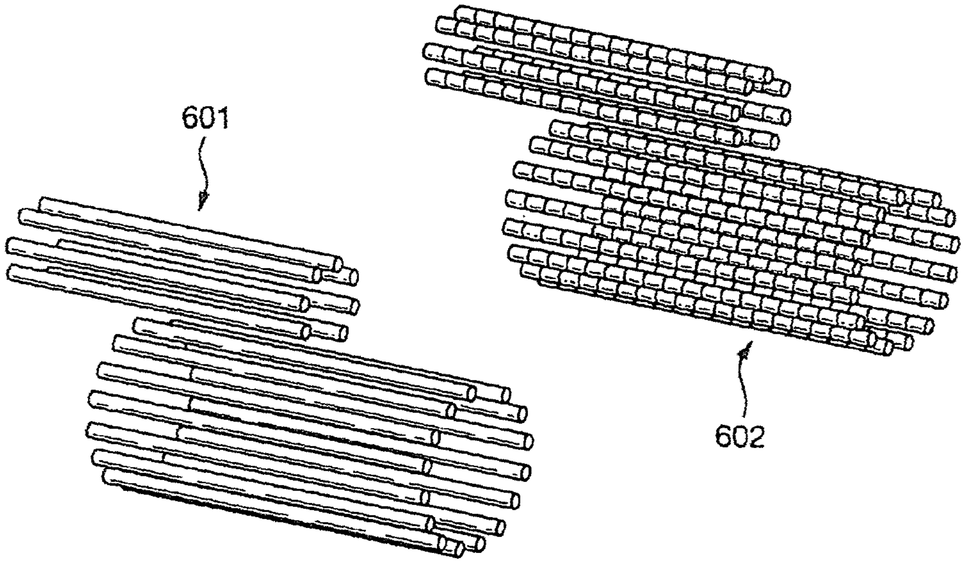
FIG. 6 shows a further embodiment of the invention.

FIG. 6 shows two rod set configurations. The first rod set 601 uses continuous rods to create the conjoined ion guides, whilst the second rod set 602 shows the rod sets segmented into smaller units so that DC voltages or a travelling pulse can be applied to each stage.

Figure 7:
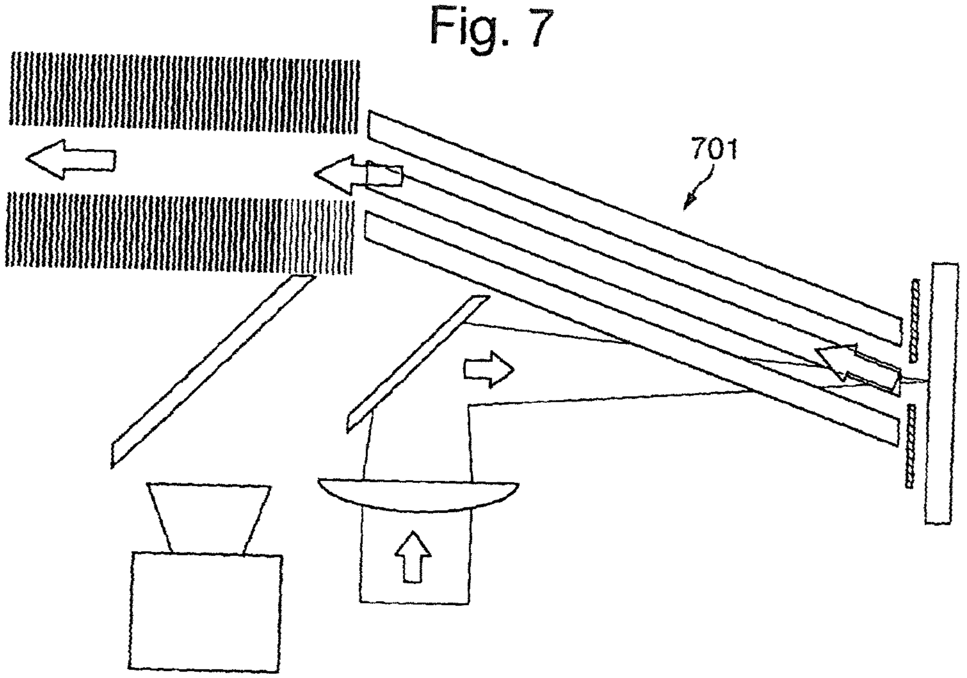
FIG. 7 illustrates a configuration using a hexapole RF guide mounted at an angle to draw ions away from the laser optic axis.

FIG. 7 illustrates a configuration using a hexapole RF guide 701 mounted at an angle to draw ions away from the laser optic axis.

Figure 8:
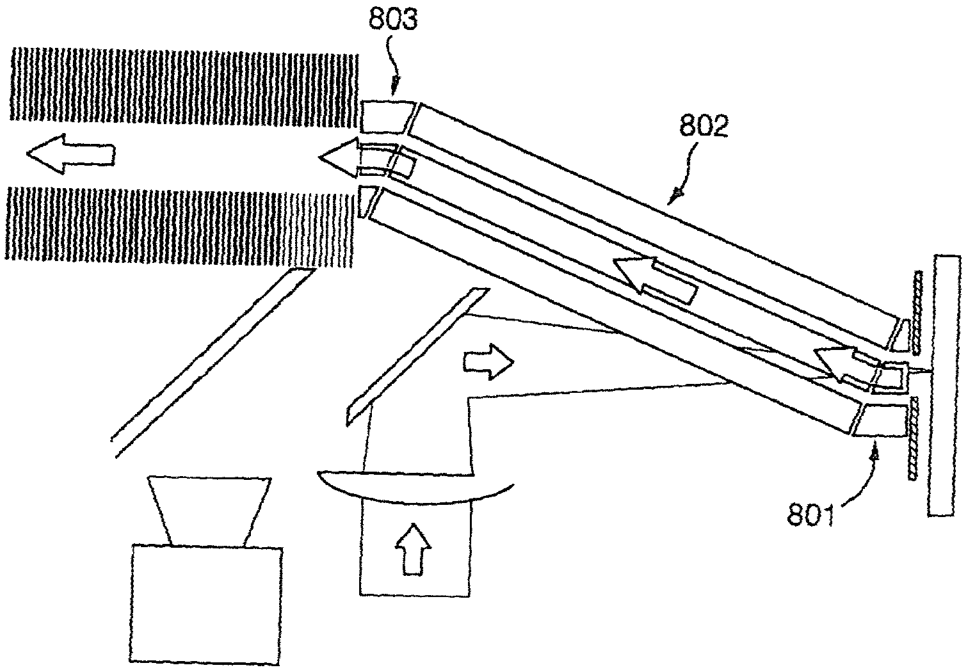
FIG. 8 shows an embodiment using hexapole ion guides in three parts.

FIG. 8 shows an arrangement using hexapole ion guides in three parts. The initial rod set 801 is orthogonal to the sample target plate and co-axial with the incident laser path, whilst the main length of the hexapole 802 is mounted at an angle. A third section 803 is parallel to the first ion guide.

Figure 9:
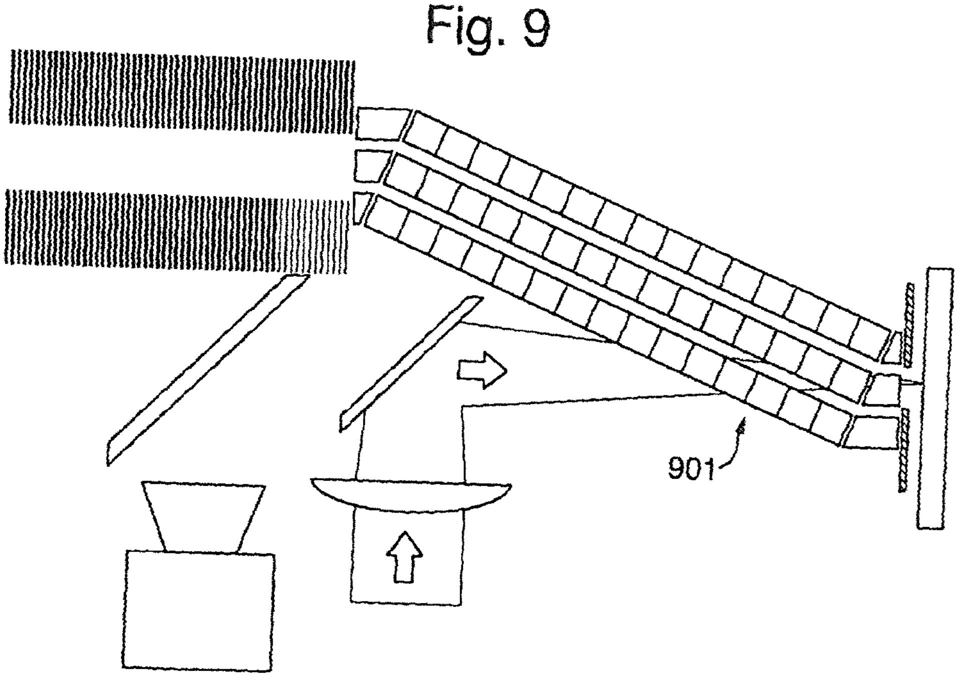
FIG. 9 shows an example of a segmented hexapole in accordance with an embodiment.

FIG. 9 is a diagram showing an example of how the main segment of the hexapole may be segmented 901 into smaller units so that DC voltages or a travelling pulse can be applied to each stage.

Figure 10:
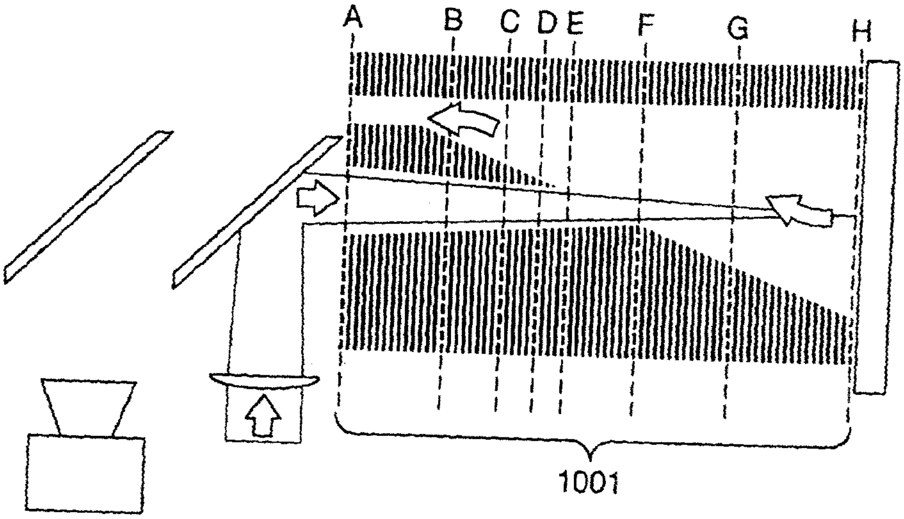
FIG. 10 shows a cross section of a sheared RF ion funnel in accordance with an embodiment.

FIG. 10 shows a cross section of a sheared RF ion funnel 1001 with a central bore to enable the laser light to be directed orthogonally onto the sample target surface, whilst the ion current is drawn away from the optic axis.

Figure 11:
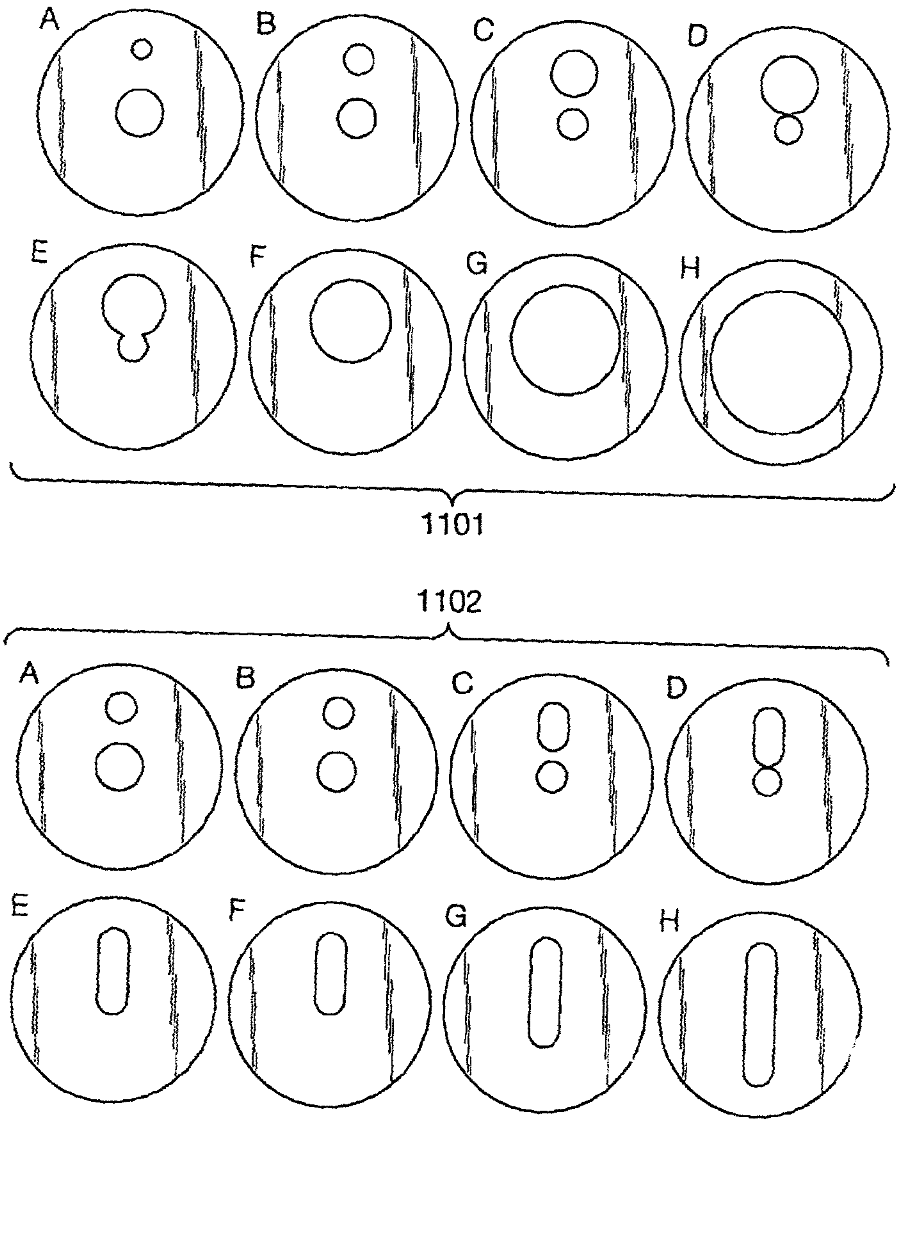
FIG. 11 shows a plan view of the electrodes in the sheared ion funnel in FIG. 10.

FIG. 11 shows the plan view of the electrodes in the sheared ion funnel in FIG. 10 at different cross sections (marked A to H) using circular geometry apertures 1101 or slotted geometry apertures 1102.

Figure 12:
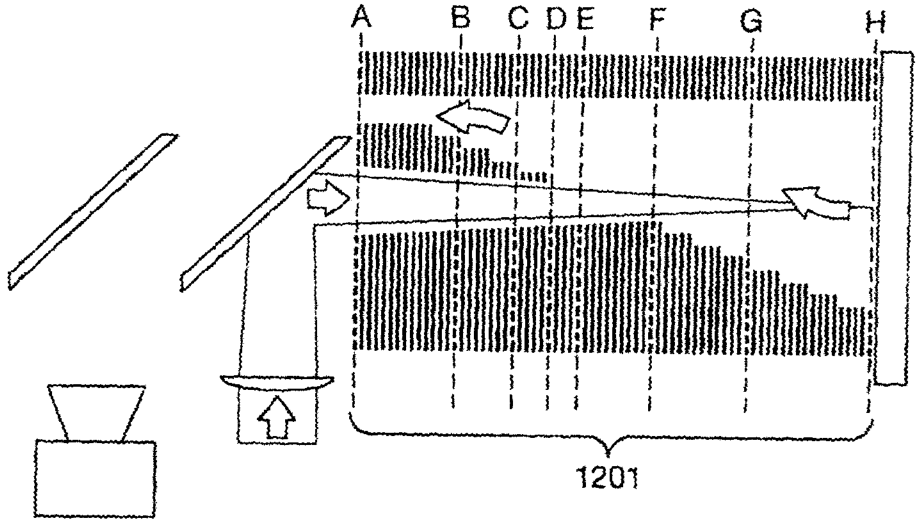
FIG. 12 shows a cross section of a sheared RF ion funnel constructed in stepped diameters.

FIG. 12 shows a cross section of a sheared RF ion funnel constructed in stepped diameters 1201 with a central bore to enable the laser light to be directed orthogonally onto the sample target surface, whilst the ion current is drawn away from the optic axis.

Figure 13:
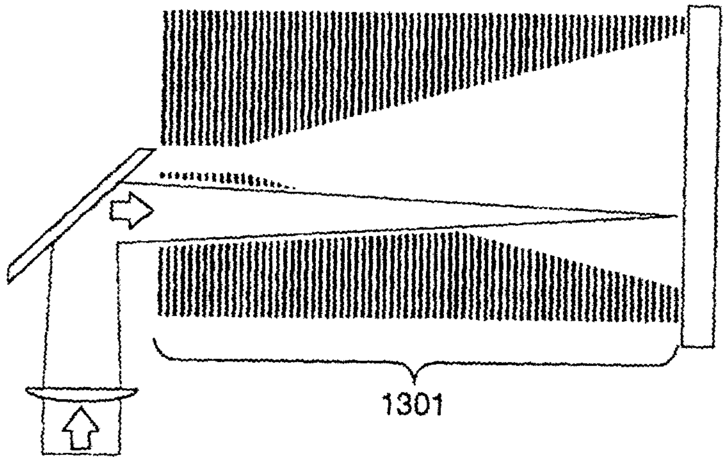
FIG. 13 shows a cross section of a symmetrical RF ion funnel.

FIG. 13 shows a cross section of a symmetrical RF ion funnel 1301 with an off-axis bore to enable the laser light to be directed orthogonally onto the sample target surface, whilst the ion current is drawn away from the optic axis.

Figure 14:
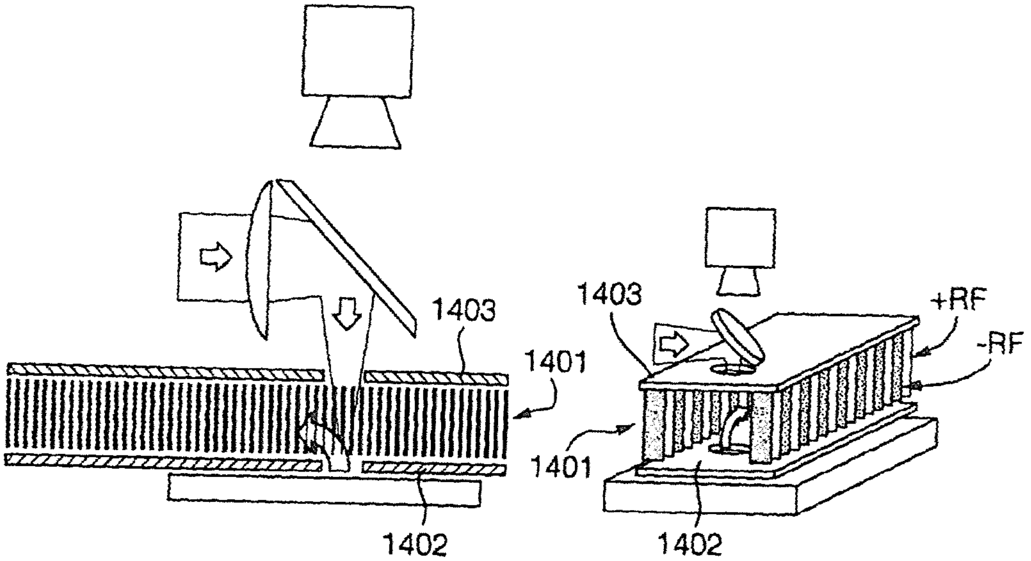
FIG. 14 illustrates a stacked plate geometry running parallel with the sample target plate.

FIG. 14 illustrates a stacked plate geometry running parallel with the sample target plate. RF of opposite polarity is applied to sequential plates 1401 with DC or travelling DC pulses superimposed upon the RF. DC voltage is applied to the confining plates 1402 and 1403.

Figure 15:
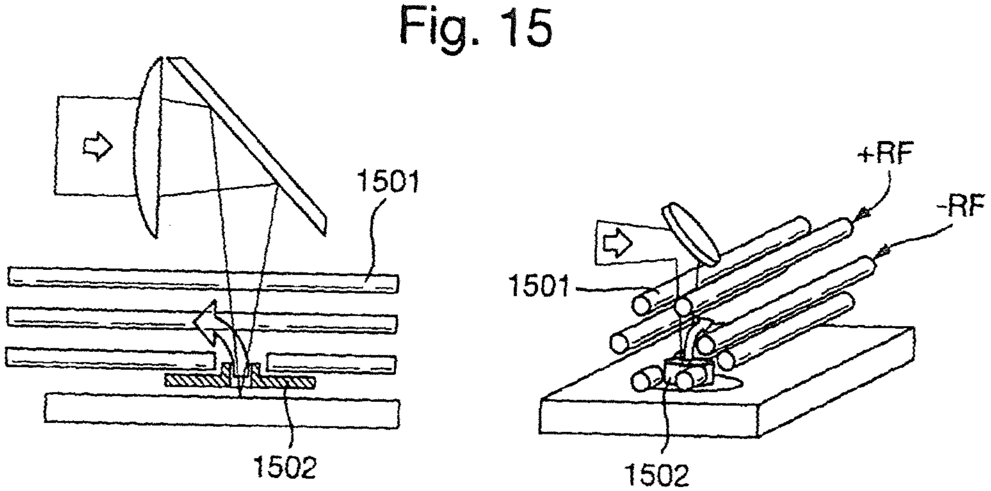
FIG. 15 shows a hexapole ion guide running parallel with the sample target plate.

FIG. 15 shows a hexapole ion guide 1501 running parallel with the sample target plate. A section in the lower two rods allows an extraction electrode 1502 with a DC voltage to draw ions from the sample and into the RF confinement.

Figure 16:
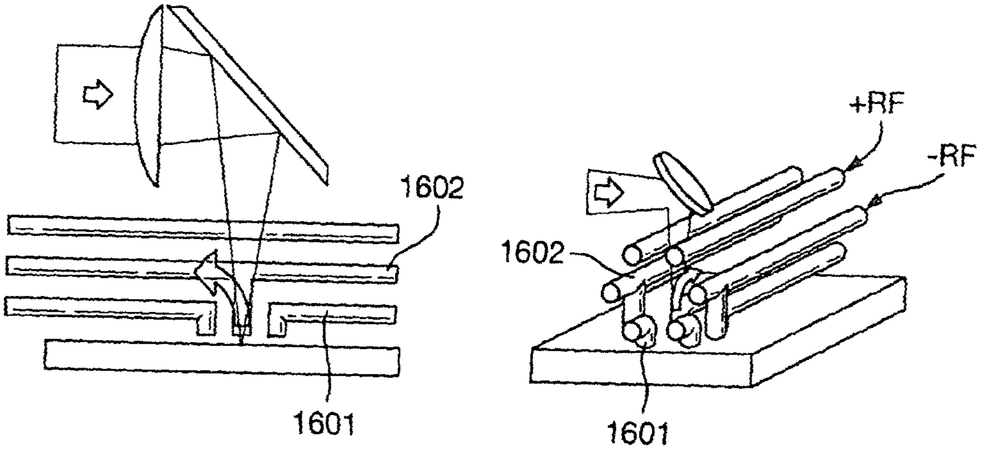
FIG. 16 shows a hexapole ion guide running parallel with the sample target plate.

FIG. 16 shows a hexapole ion guide running parallel with the sample target plate. A section in the lower two rods guide allows four rods to be lowered towards the target sample surface producing four L-shaped rods 1601 and two extensions from the centre rods to descend between the L-shaped rods to form T-shaped rods 1602.

A preferred embodiment of the current invention comprises: a mass spectrometer for use in MALDI MS, using mirrors to transfer the laser pulse from the output of the laser head to the imaging optics focusing the laser pulse onto the laser target (see 201 in FIG. 2); and an ion guiding device comprising of three distinct sections: a first ion guide section consisting of a stack of large aperture conducting rings 202 with a confining RF voltage with opposing phase on each subsequent ring; a second region consisting of an ion guide 203 which is conjoined with a second ion guide 204; and a third region consisting of a stack of smaller aperture conducting rings 205. Ions are urged across a radial pseudo-potential barrier which separates the two ion guiding regions by a DC potential gradient. Ions may be radially transferred from an ion guide which has a relatively large cross-sectional profile to an ion guide which has a relatively small cross-sectional profile in order to improve the subsequent ion confinement of the ions and transfer the ions to a secondary ion optic axis parallel 301 to the incident laser 302 optic axis. A dichroic mirror (see 303 in FIG. 3) located behind the larger aperture conjoined electrode stack 304 directs the laser pulse along the axis of the electrodes onto the sample target plate 305 by reflection whilst allowing visible light to be transmitted from the sample plate through to a silvered mirror 306, which, in turn, directs the light to a camera 307. The laser light is focused through a lens 308.

The plume of material ablated by the laser consists of both ions and neutral species. The ions are confined within the pseudo-potential formed by the RF guide and may be drawn along the ion guide by use of a pulsed DC voltage superimposed upon the RF and travelling along sequential pairs of electrodes along the length of the guide (travelling wave). Alternatively, the ions formed in the plume may be directed along the axis of the RF guide by means of DC axial fields. The benefit of such an arrangement, using a travelling pulse or DC axial fields, would be the ability to maintain the integrity of the ion packets, keeping them spatially and temporally distinct from one laser pulse to the next, and would prevent them from coalescing to form a continuous or pseudo continuous ion beam. Other configurations may include the implementation of a trapping region in the RF guide for accumulation and pulsed transmission of the generated ions. The region may also consist of an ion mobility separation cell (IMS) or a Field Asymmetric Ion Mobility spectrometer region (FAIMS).

The presence of an inert gas within the ion guide volume acts to reduce the radial kinetic energy of ions confined within the guide, and reduces the internal energy of the ions by collisional cooling effects. The direction of flow on the gas may be opposing the ion drift trajectory to assist in screening the laser optics from the neutral species generated, or along the ion drift trajectory to assist the transit of ions along the guide.

The inclusion of an aperture 401 between the sample plate and the ion guide also allows for the option of differential pumping, such that the pressure at the sample plate may be several orders of magnitude higher than the pressures in the ion guide volume. This would allow for atmospheric pressure and intermediate pressure MALDI to be performed. Other embodiments may use alternative ionization techniques such as SIMS or laser diode thermal desorption.

The MALDI process is affected by numerous factors, several of which are mutually dependent. Many of these parameters have been investigated since the MALDI process was first published. Despite this, the mechanisms involved in the generation of analyte ions from the MALDI source are still not fully understood, and are still the subject of intense research.

The matrices used are typically highly absorbing in the UV wavelength range (typically 300 to 360 nm) and commercial mass spectrometers predominantly use ultraviolet lasers, e.g. nitrogen lasers (λ=337 nm) or harmonics of Nd:YAG lasers (λ=355 nm, or λ=266 nm). Nitrogen lasers use nitrogen gas as a lasing medium, whereas Nd:YAG use a YAG (Yttrium Aluminium Garnet:Y3Al5O12) crystal doped with neodymium ions. The Nd:YAG laser produces a light in the near infra-red (λ=1064 nm) which is subsequently frequency tripled or quadrupled using non-linear optical crystals. The energy may be provided by a laser, for example from the group comprising: Nitrogen, Nd:YAG, $CO_2$, Er:YAG, UV and IR.

The laser pulse durations typically used for MALDI range from 1 to 20 ns, although shorter pulses (in the range of picoseconds) have also been used. The laser may comprise a pulse frequency, for example selected from the following ranges: 1-10 Hz, 10-100 Hz, 100-1000 Hz, 1000-10000 Hz, 10000-100000 Hz.

Lasers emitting in the infra-red region of the electromagnetic spectrum have also been used. The UV MALDI method delivers energy to the matrix molecules via the excitation of the electron energy states, whereas IR MALDI excites the vibration modes of the matrix molecules.

Many different types of Matrix can be used, these include: 2,5-dihydroxy benzoic acid, 3,5-dimethoxy-4-hydroxycinnamic acid, 4-hydroxy-3-methoxycinnamic acid, α-cyano-4-hydroxycinnamic acid, Picolinic acid, 3-hydroxy picolinic acid.

The laser light delivery system for MALDI usually includes a laser and associated optical components (e.g. mirrors, electro-optics and lenses) to transfer the laser pulse from the laser head to the analyte sample location on the MALDI sample. The beam optics are designed to shape and deliver a suitable laser beam spatial intensity profile to the sample.

Laser systems typically used for MALDI vary, not only in their wavelength, but also in their spatial intensity profile. For solid state lasers such as Nd:YAG, the lasing medium is a crystal doped with ions enclosed within a laser resonator and optically excited using flash lamps or laser diodes. They have a relatively low amplification, meaning that suitable gain in the laser intensity is achieved by a multiple of passes of the laser radiation within the laser resonator. The resulting output laser beam has a spatial intensity profile that consists predominantly of one fundamental transverse mode. The radial intensity of the fundamental transverse mode corresponds to a rotationally symmetric Gaussian function orthogonal to the axis of propagation. Such a beam profile can be focused to a minimum diameter, or beam waist, which is diffraction limited. The position of the final focusing lens and its focal length are determining factors for the minimum spot diameter and it is preferable to be as close to the MALDI sample as possible.

Conversely, the nitrogen laser, which has been traditionally used for MALDI applications, uses nitrogen gas excited by an electrical discharge between electrodes as its lasing medium. Nitrogen exhibits a high laser gain on the most intense laser line meaning that the energy population inversion can be quenched and the laser pulse can achieve a high intensity even without the presence of a resonator. Consequently, even with the use of a laser resonator, the spatial intensity profile of the emitted laser pulse consists of many transverse modes superimposed. As a result, the subsequent beam cannot be focused to the same degree. Furthermore, because of many factors: the fluid nature of the gas; inhomogeneities in the electrical discharge within the gas; and thermal variations introduced by the electrical discharge from each emission, the amplification profile is not homogeneous. These factors, combined with the short period over which lasing occurs result in a spatial intensity distribution that is neither uniform nor reproducible from one shot to the next. When this laser profile is focused onto the MALDI target the resulting intensity profile is highly modulated. However, because of the temporally varying emission from the laser, over a multiple of laser shots, the cumulative intensity distribution is averaged into a more homogenous profile.

A preferred embodiment of the current invention comprises: a mass spectrometer for use in MALDI MS, using a combination of mirrors to direct the laser pulse from the laser head to the sample target plate; an optical lens to focus the laser radiation onto the laser target plate; an RF guide to collect and guide the ions generated in the MALDI plume, configured in such a way as to direct the ions along a path away from the optic axis of the incident laser pulse. The laser is directed orthogonal to the surface of the target sample plate.

The RF guide would preferably be constructed with three separate regions: a first, large aperture stack of ring electrodes arranged such that the RF applied each sequential ring is in anti-phase with its immediate neighbours; a second region comprising of a large and small aperture conjoined RF guides both guides arranged such that the RF applied each sequential ring is in anti-phase with its immediate neighbours and a DC potential applied between the two guides so as to drive ions across the radial pseudo-potential barrier which separates the two ion guiding regions; third, a region constructed using a small aperture RF guide arranged such that the RF applied each sequential ring is in anti-phase with its immediate neighbours.

A DC potential difference, or, preferably, a DC pulsed square wave applied sequentially along the length of the ion guide, provides a mechanism to propagate ions along the ion guide. A DC offset between the two conjoined ion guides provides a method of directing the ion beam away from the optic axis of the incident laser beam.

The laser source preferentially is a solid state Nd:YAG producing pulsed laser radiation with a duration of between 500 ps and 10 ns at a wavelength of 355 nm. Alternative solid state laser sources such as Nd:YLF, or Nd:YVO4 or gas lasers such as nitrogen, may also be used to produce UV wavelength in the range 266 to 360 nm or IR wavelength in the range 1 to 4 μm.

The laser pulse itself may be transmitted by reflection off a number of beam steering mirrors before the final focusing element or by coupling to on optical fibre with a core diameter between 50 to 300 μm, preferably with a core diameter of 150 μm. Beam transformation optical elements (diffractive or refractive optics, and/or micro-mechanical adjustable optics) may be included within the beam path to transform the spatial intensity profile of the propagating laser beam.

An inert gas within the volume of the confining RF acts to reduce the radial kinetic energy of ions confined within the guide, and reduces the internal energy of the ions by collisional cooling effects. The direction of flow on the gas may be opposing the ion drift trajectory to assist in screening the laser optics from the neutral species generated, or along the ion drift trajectory to assist the transit of ions along the guide.

It will be apparent to those skilled in the art that various modifications may be made to the particular embodiment discussed above without departing from the scope of the invention. The deflection of the ion beam away from the laser optical axis may be precipitated by many variations in the geometries of the RF confining ion guides.

In the preferred embodiment, the presence of a DC voltage superimposed upon the RF voltage along all three sections of the conjoined ion guide, or more preferably, a travelling wave pulse propagating along the guide, may be used to assist the transfer of ions along the ion guide.

In another preferred embodiment, the conjoined ring stack may be substituted for a set of RF guide rods (FIG. 5). These, in turn may be constructed from segments (FIG. 6) electrically isolated to enable a DC voltage, or a travelling wave pulse propagating along the guide to be superimposed upon the RF voltage.

In a further embodiment, the RF guide may be sheared at an angle to confine the ion beam in a direction deviating from the axis orthogonal to the target sample plate (FIG. 7). This may be included between two sections that are mounted parallel to the incident laser beam (FIG. 8) and may be orientated at an acute angle to the incident laser beam or at right-angles to the laser beam.

The angled ion guide may be constructed in segments (FIG. 9) electrically isolated to enable a DC voltage, or a travelling wave pulse propagating along the guide to be superimposed upon the RF voltage.

Another embodiment would be the employment of a sheared conical ion funnel with a central bore suitable for the transmission of the incident laser pulse onto the sample target plate in an orthogonal manner (FIG. 10). A DC voltage, or a travelling wave pulse propagating along the guide transmits the ions from the sample target plate to the exit of the ion guide. The ion guide may be fabricated using circular geometries, slots or other suitable shapes (FIG. 11).

The sheared conical funnel may be constructed also in steps of grouped electrodes (FIG. 12).

A cylindrically symmetric conical ion funnel including a bore located away from the central axis (FIG. 13) may be included to allow the laser pulse to be incident upon the sample target plate in an orthogonal manner, to produce a plume of ions away from the central axis. The pseudo-potential well generated by the RF draws ions away from their initial point of formation towards the central axis of the ion funnel.

A further embodiment would be the employment of pairs of plate electrodes stacked in a line parallel with the sample target plate, and sandwiched between two parallel plates (FIG. 14). A confining RF potential is applied with inverted phase between each sequential pair of plates within the stack, producing a confining field in one axis, whilst a DC potential applied to the two plates sandwiching the stack confines the ions orthogonally to the RF confinement. An aperture within the sandwiching plates allows the laser to be delivered orthogonal to the sample target plate. Generated ions are drawn into the guide and propagated along the axis of the ion guide.

In a similar manner, an RF confining rod geometry such as a hexapole positioned parallel to the sample target plate may include break in the lower electrodes to accommodate an electrode with an aperture (FIG. 15), to which a DC potential may be applied to draw ions generated from the orthogonally incident laser pulse into the confining volume of the RF ion guide. Again, the ion guide may be constructed in segments electrically isolated to enable a DC voltage, or a travelling wave pulse propagating along the guide to be superimposed upon the RF voltage to drive ions along the ion guide.

In a variation to this, extension rods can be included at the ends of the broken rods, orthogonal to the RF guide axis, descending towards the target sample plate (FIG. 16), to form an L-shaped rod. Rods, connected to the rods forming the ion guide further from the sample target plate, form T-shaped rods. In this configuration, the confining RF is extended towards the sample target plate, and guides ions into the primary axis of the ion guide.

The ion separation system may be followed by a mass analyser. In the preferred embodiment this may be a Time of Flight analyser. Further embodiments may include the analyser being a quadrupole mass analyser; a 2D or linear quadrupole mass analyser; a Paul or 3D quadrupole mass analyser; a Penning trap mass analyser; an ion trap mass analyser; a magnetic sector mass analyser; Ion Cyclotron Resonance ("ICR") mass analyser; a Fourier Transform Ion Cyclotron Resonance ("FTICR") mass analyser; an electrostatic mass analyser; Fourier Transform electrostatic mass analyser or a Fourier Transform mass analyser.

Figure 17A:
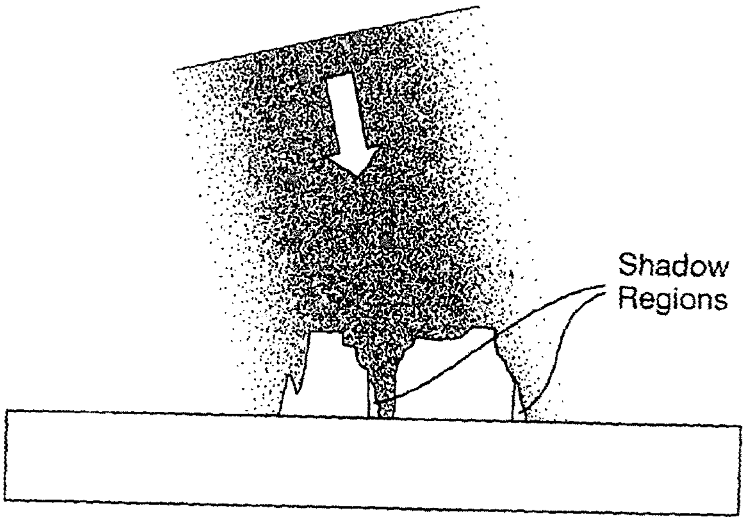
FIG. 17A illustrates the problem of shadow regions which may be formed if a laser is incident upon a target substrate at an angle to the perpendicular and FIG. 17B illustrates how an inclined laser beam alters the profile of the laser spot on a target substrate.

FIG. 17A illustrates an advantageous aspect of the present invention. The preferred embodiment enables the laser beam incident upon the target substrate to be incident at a normal or near normal angle of incidence. This is advantageous compared with conventional arrangements wherein the laser beam is incident at an angle. FIG. 17A shows that when a laser beam is incident at an angle there can be a degree of shadowing of the radiation due to inhomogeneity of the matrix crystals. As a result, ions emit predominantly from the areas of the crystal surface which are normal to the incident laser beam.

Figure 17B:
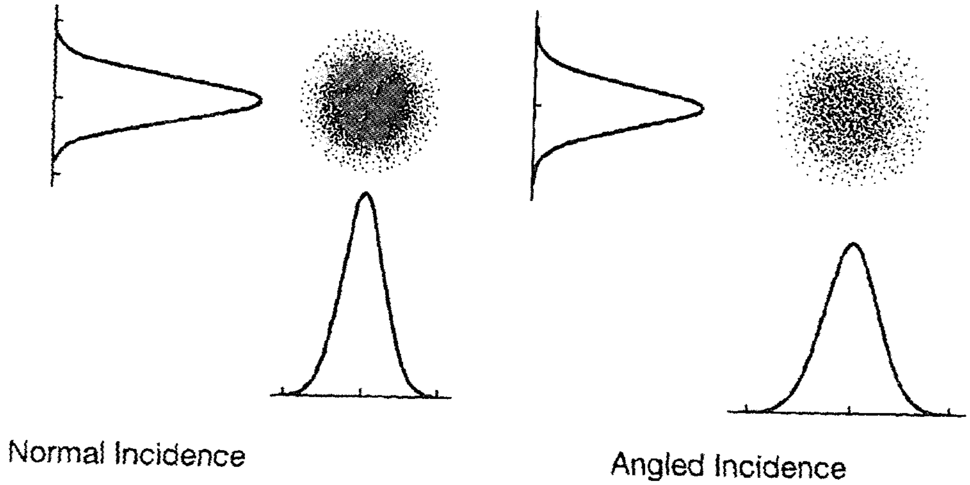

Another problem with conventional arrangements is illustrated in FIG. 17B. As will be appreciated by those skilled in the art and as shown in FIG. 17B the closer the laser beam is to normal incidence the more circular the intensity distribution is and the higher the peak intensity is. Consequently, it is desirable to have a more circular spot which also requires less power for equivalent peak fluences.

It will be appreciated, therefore, that the preferred embodiment is particularly advantageous.

Although the present invention has been described with reference to preferred embodiments, it will be understood by those skilled in the art that various changes in form and detail may be made without departing from the scope of the invention as set forth in the accompanying claims.

The invention claimed is:

1. An ion source for a mass spectrometer comprising:

one or more optical components arranged and adapted to focus, in use, a laser beam so as to impinge directly upon an upper surface of a target substrate in order to cause the release of ions from said upper surface, wherein said one or more optical components have an effective focal length ≤300 mm and wherein, in use, said one or more optical components direct said laser beam along a first axis onto the target substrate at an angle $\theta$ with respect to the perpendicular to the target substrate, wherein $\theta \leq 3°$;

an ion guide comprising a plurality of electrodes arranged and adapted to receive ions released from said upper surface of said target substrate and to onwardly transmit said ions along an ion path which avoids said one or more optical components; and a device arranged and adapted to apply an AC or RF voltage to at least some of said plurality of electrodes in order to create a pseudo-potential which acts to confine ions radially within said ion guide;

wherein at least a portion of said ion path is along a second axis, wherein said first axis and said second axis are substantially perpendicular relative to each other.

2. An ion source as claimed in claim 1, wherein said ion guide is oriented substantially at right-angles to said laser beam and/or wherein said ion guide is substantially parallel to the upper surface of the target substrate.

3. An ion source as claimed in claim 1, wherein said ion guide comprises a multipole or segmented multipole rod set.

4. An ion source as claimed in claim 1, wherein said ion guide comprises a plurality of stacked plate electrodes.

5. An ion source as claimed in claim 4, wherein said stacked plate electrodes are sandwiched between two parallel plates, and wherein said parallel plates comprise an aperture to allow said laser beam to be delivered orthogonal to the sample target plate.

6. An ion source as claimed in claim 3, further comprising an apertured DC extraction electrode.

7. An ion source as claimed in claim 1, wherein said ions are drawn away from the laser optic axis by said ion guide and/or wherein ions are drawn into the ion guide.

8. An ion source as claimed in claim 1, further comprising a laser arranged and adapted to generate said laser beam.

9. An ion source as claimed in claim 1, further comprising a mirror or a lens for directing said laser beam onto the target substrate and wherein either: (i) said ion path avoids said mirror or lens; or (ii) said ion path does not pass through said mirror or lens.

10. An ion source as claimed in claim 1, further comprising a device arranged and adapted to maintain said target substrate at a pressure selected from the group consisting of: (i) >100 mbar; (ii) >10 mbar; (iii) >1 mbar; (iv) >0.1 mbar; (v) $>10^{-2}$ mbar; (vi) $>10^{-3}$ mbar; (vii) $>10^{-4}$ mbar; (viii) $>10^{-5}$ mbar; (ix) $>10^{-6}$ mbar; (x) <100 mbar; (xi) <10 mbar; (xii) <1 mbar; (xiii) <0.1 mbar; (xiv) $<10^{-2}$ mbar; (xv) $<10^{-3}$ mbar; (xvi) $<10^{-4}$ mbar; (xvii) $<10^{-5}$ mbar; (xviii) $<10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar.

11. An ion source as claimed in claim 1, wherein said one or more optical components comprise one or more focusing lenses.

12. An ion source as claimed in claim 1, wherein said one or more optical components comprise one or more mirrors for reflecting said laser beam onto the target substrate.

13. An ion source as claimed in claim 1, wherein said target substrate further comprises a matrix.

14. An ion source as claimed in claim 1, wherein said one or more ion guides are arranged and adapted to receive ions or packets of ions and to onwardly transmit said ions or packets of ions whilst keeping said ions or packets of ions isolated from each other.

15. An ion source as claimed in claim 1, wherein said one or more ion guides are arranged and adapted to transmit simultaneously multiple groups or packets of ions.

16. An ion source as claimed in claim 1, further comprising a device arranged and adapted to translate a plurality of DC and/or pseudo-potential wells along the length of said one or more ion guides.

17. An ion source as claimed in claim 1, further comprising a device arranged and adapted to apply one or more transient, intermittent or permanent DC voltages to electrodes comprising said one or more ion guides in order to keep multiple groups or packets of ions isolated from each other.

18. An ion source as claimed in claim 1, further comprising a device arranged and adapted to confine axially multiple groups or packets of ions in individual DC and/or pseudo-potential wells within said one or more ion guides.

19. An ion source for a mass spectrometer comprising:

one or more optical components arranged and adapted to focus, in use, a laser beam so as to impinge directly upon an upper surface of a target substrate in order to cause the release of ions from said upper surface, wherein, in use, said one or more optical components direct said laser beam along a first axis onto the target substrate;

an ion guide comprising a plurality of electrodes arranged and adapted to receive ions released from said upper surface of said target substrate and to onwardly transmit said ions along an ion path which avoids said one or more optical components; and wherein said ion guide is oriented at an angle to said laser beam so that at least a portion of said ion path is along a second axis, wherein said first axis and said second axis are substantially perpendicular to each other.

20. An ion source for a mass spectrometer comprising:

one or more optical components arranged and adapted to focus, in use, a laser beam so as to impinge directly upon an upper surface of a target substrate in order to cause the release of ions from said upper surface, wherein said one or more optical components have an effective focal length ≤300 mm and wherein, in use, said one or more optical components direct said laser beam along a first axis onto the target substrate at an angle θ with respect to the perpendicular to the target substrate, wherein θ≤3°; and an ion guide comprising a plurality of electrodes arranged and adapted to receive ions released from said upper surface of said target substrate and to onwardly transmit said ions along an ion path which avoids said one or more optical components, wherein said ion guide is arranged to surround at least a part of the path of the laser beam.

* * * * *